United States Patent [19]
Kobayashi et al.

[11] Patent Number: 5,648,694
[45] Date of Patent: Jul. 15, 1997

[54] MOTOR STATOR ASSEMBLY AND FULL-CIRCUMFERENTIAL FLOW PUMP EMPLOYING SUCH MOTOR STATOR ASSEMBLY

[75] Inventors: Makoto Kobayashi; Masakazu Yamamoto; Yoshio Miyake, all of Fujisawa, Japan

[73] Assignee: Ebara Corporation, Tokyo, Japan

[21] Appl. No.: 322,425

[22] Filed: Oct. 13, 1994

[30] Foreign Application Priority Data

| Oct. 13, 1993 | [JP] | Japan | ................................. 5-280111 |
| Oct. 13, 1993 | [JP] | Japan | ................................. 5-280112 |
| Dec. 28, 1993 | [JP] | Japan | ................................. 5-350995 |

[51] Int. Cl.[6] ................... H02K 15/14; F04D 13/00
[52] U.S. Cl. ............... 310/87; 310/89; 417/423.14; 417/424.1
[58] Field of Search ............... 310/87, 88, 89; 415/196; 417/423.14, 424.1

[56] References Cited

U.S. PATENT DOCUMENTS

| 1,879,625 | 9/1932 | Mendenhall et al. | 310/87 |
| 2,612,843 | 10/1952 | Gruetjen | 103/87 |
| 3,035,192 | 5/1962 | Schaeffer | 310/89 |
| 3,047,753 | 7/1962 | Westell | 310/89 |
| 4,086,507 | 4/1978 | Roland et al. | 310/88 |
| 4,205,246 | 5/1980 | Wise et al. | 310/88 |
| 4,632,643 | 12/1986 | Nielsen | 310/87 |
| 5,250,863 | 10/1993 | Brandt | 310/87 |
| 5,385,454 | 1/1995 | Kimura et al. | 417/423.12 |
| 5,388,971 | 2/1995 | Maeda et al. | 417/423.14 |
| 5,401,146 | 3/1995 | Moriya et al. | 417/423.14 |
| 5,428,256 | 6/1995 | Schloss | 310/87 |
| 5,497,544 | 3/1996 | Bien et al. | 29/596 |

FOREIGN PATENT DOCUMENTS

| 0634827 | 1/1995 | European Pat. Off. | 310/89 |
| 1538993 | 10/1969 | Germany | 310/89 |
| 6050282 | 2/1994 | Japan | 417/423.14 |
| 6088587 | 3/1994 | Japan | 417/423.14 |
| 0928604 | 6/1963 | United Kingdom | 310/87 |

*Primary Examiner*—Thomas M. Dougherty
*Attorney, Agent, or Firm*—Oblon, Spivak, McClelland, Maier & Neustadt, P.C.

[57] ABSTRACT

A motor stator assembly is incorporated in a full-circumferential flow pump which has an annular space around a motor. The motor stator assembly comprises a stator, an outer frame casing encasing the stator, an outer cylinder made of sheet metal disposed around the outer frame casing with an annular space defined therebetween, and a cable housing hermetically welded to the outer frame casing and the outer cylinder, for housing leads of the stator. The outer cylinder can be elongated axially so as to cover the end portions of the motor frame.

15 Claims, 21 Drawing Sheets

5,648,694

MOTOR STATOR ASSEMBLY AND FULL-CIRCUMFERENTIAL FLOW PUMP EMPLOYING SUCH MOTOR STATOR ASSEMBLY

BACKGROUND OF THE INVENTION

1. Field of the Invention

The present invention relates to a motor stator assembly and a full-circumferential flow pump employing such a motor stator assembly, and more particularly to a motor stator assembly including an outer frame casing provided around a motor stator and an outer cylinder disposed around the outer frame casing with an annular space defined therebetween, and a full-circumferential flow pump employing such a motor stator assembly.

2. Description of the Prior Art

There have been known full-circumferential flow pumps which have an annular fluid passage between a pump casing and a motor accommodated in the pump casing. In general, the full-circumferential flow pump has a pump casing comprising a suction-side casing, a discharge-side casing, and an outer cylinder extending between the suction-side casing and the discharge-side casing. The suction-side casing and the discharge-side casing are generally highly rigid as they are each made of a casting such as an iron casting.

The full-circumferential flow pump also includes a motor fixedly supported in the rigid suction- and discharge-side casings.

The motor can fixedly be supported in the suction and discharge-side casings because they are in the form of rigid castings. If these casings comprise sheets pressed to shape, the motor cannot fixedly be supported in the casings because they are not sufficiently rigid.

SUMMARY OF THE INVENTION

It is therefore an object of the present invention is to provide a full-circumferential flow pump which has a motor securely supported in a pump casing made of sheet metal.

Another object of the present invention is to provide a motor stator assembly which provides excellent productivity and can be applied to many types of pumps.

According to one aspect of the present invention, there is provided a motor stator assembly comprising: a stator; an outer frame casing encasing the stator; an outer cylinder made of sheet metal disposed around the outer frame casing with an annular space defined therebetween; and a cable housing for housing leads of the stator, the housing being hermetically welded to the outer frame casing and the outer cylinder. The cable housing has a receptacle-like body having an open end and a bottom. The open end is welded to the outer frame casing and the bottom has a hole for taking out leads of the stator. The cable housing has a dimension larger than that of the hole in at least one direction within the annular space.

According to another aspect of the present invention, there is provided a motor stator assembly comprising: a stator; an outer frame casing encasing the stator; projections provided on the outer frame casing and projecting radially outwardly; and an outer cylinder made of sheet metal disposed around the outer frame casing with an annular space defined therebetween, the outer cylinder being formed by winding sheet metal so as to surround the projections.

According to another aspect of the present invention, there is provided a motor stator assembly comprising: a stator; an outer frame casing encasing the stator; projections provided on the outer frame casing and projecting radially outwardly; and an outer cylinder made of sheet metal disposed around the outer frame casing with an annular space defined therebetween, the outer cylinder being formed by two annular members each having a notch at one end thereof in such a manner that one of the projections is fitted in the notches of the annular members.

According to still another aspect of the present invention, there is provided a full-circumferential flow pump comprising: a motor stator assembly including a stator, an outer frame casing encasing the stator, an outer cylinder made of sheet metal disposed around the outer frame casing with an annular space defined therebetween and a cable housing hermetically welded to the outer frame casing and the outer cylinder, for housing leads of the stator; a motor rotor assembly including a main shaft and a rotor fitted on the main shaft; a pump assembly mounted on the main shaft for pumping a fluid into the annular space; and cover members connected to respective ends of the outer cylinder for forming a pump casing with the outer cylinder.

According to the present invention, the outer cylinder can be elongated axially so as to cover the end portions of the motor frame. In a full-circumferential flow pump of an in-line type, a suction-side pump casing and a discharge-side pump casing are formed into shapes which are easy to be pressed by making their axial depths small. In a double suction type pump, suction windows can be formed in the outer cylinder.

Further, the motor can be fixedly secured to the outer cylinder serving as a pump casing, using the cable housing or the projections.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

A first embodiment of the present invention will be described below with reference to FIGS. 1 and 2.

Figure 1:
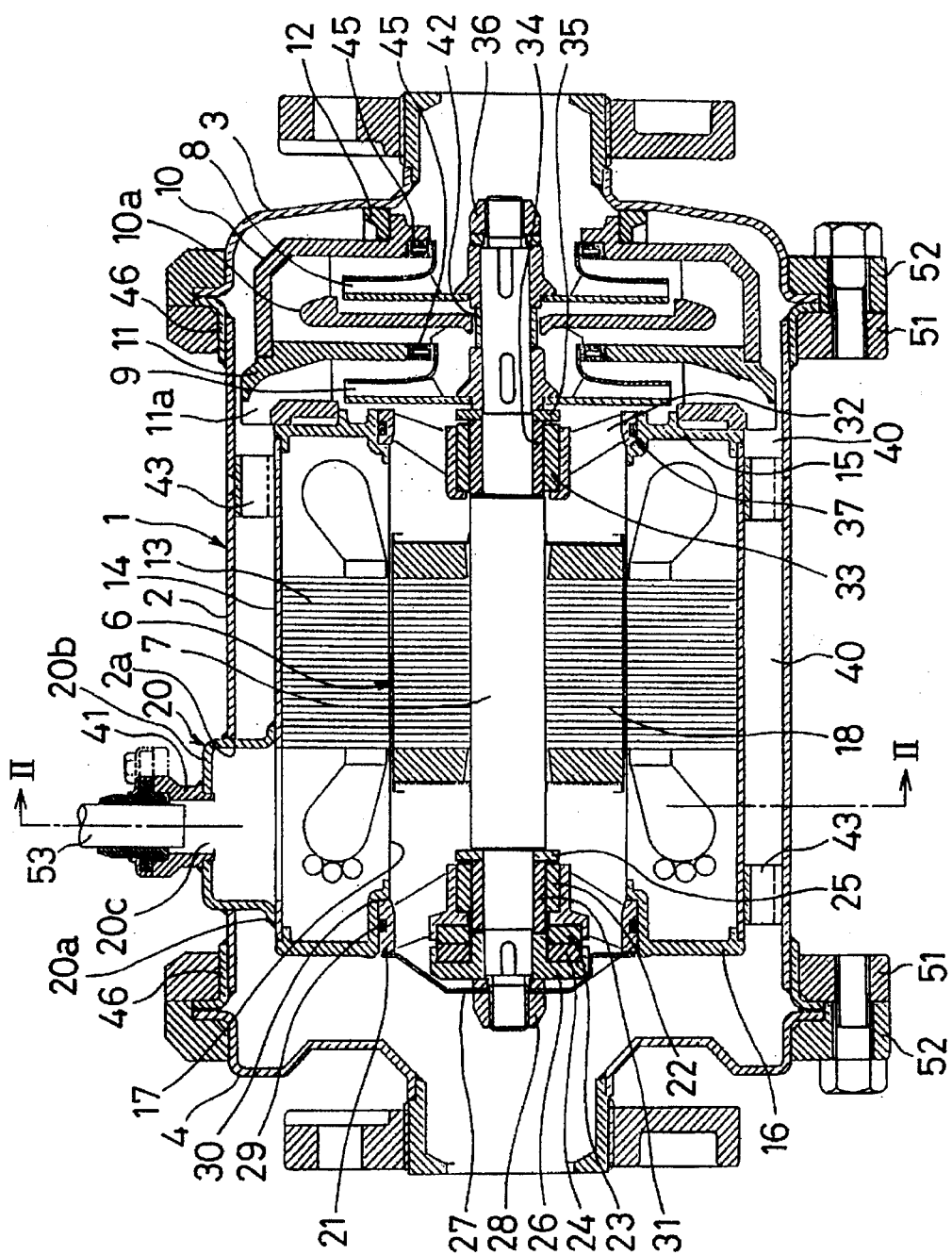
FIG. 1 is a cross-sectional view of a full-circumferential flow pump incorporating a motor stator assembly according to a first embodiment of the present invention.

FIG. 1 shows a full-circumferential flow pump using a motor stator assembly according to the present invention. The full-circumferential flow pump of this embodiment is of an in-line type. The full-circumferential flow pump comprises a motor stator assembly 1, a rotor assembly 6 supported by the motor stator assembly 1, a pump assembly including impellers 8 and 9 fixed to a main shaft 7 of the rotor assembly 6, and pump components fixed to the both ends of the motor stator assembly 1. The motor stator assembly 1 includes a stator 13, an outer frame casing 14 fitted over the stator 13, side frame members 15, 16 welded to respective open ends of the outer frame casing 14, and a can 17 fitted in the stator 13 and welded to the side frame members 15, 16. The motor stator assembly 1 further includes an outer cylinder 2 provided around the outer frame casing 14. An annular space is defined between the outer frame casing 14 and the outer cylinder 2. The pump components include a discharge-side casing 4 and a suction-side casing 3 connected to L-shaped flanges 46 provided on the both ends of the outer cylinder 2 by flanges 51 and 52. The outer cylinder 2, the suction-side casing 3 and the discharge-side casing 4 are made of sheet metal such as stainless steel and jointly serve as a pump casing.

The first-stage impeller 8 is housed in a first inner casing 10 having a return blade 10a, and the second-stage impeller 9 is housed in a second inner casing 11 having a guide device 11a. A resilient seal 12 is interposed between the first inner casing 10 and the suction-side casing 3. Liner rings 45 are provided on the respective inner ends of the first and second inner casings 10 and 11.

The rotor assembly 6 comprises a rotor 18 fitted on the main shaft 7, and thrust load side and anti-thrust load side bearing units for supporting the main shaft 7.

The outer cylinder 2 has a hole 2a in which a cable housing 20 is provided. The cable housing 20 is in the form of receptacle-like body having an open end 20a and a bottom 20b and is fixed at the open end 20a to the outer frame casing 14 by welding. The outer cylinder 2 and the cable housing 20 are hermetically welded together. A cable connector 41 for holding a cable 53 is inserted in a lead hole 20c formed in the bottom 20b of the cable housing 20, and the cable connector 41 and the cable housing 20 are welded and fixed together. The cable housing 20 has a dimension greater than that of the hole 20c in at least one direction within the annular space 40.

A bearing unit which supports the rotor assembly on an anti-thrust load side, and components associated with such a bearing unit will be described below.

A radial bearing 22 and a stationary thrust bearing 23 are mounted in a bearing bracket 21. The radial bearing 22 has an end surface serving as a stationary thrust sliding surface. The stationary thrust bearing 23 has an end surface which also serves as a stationary thrust sliding surface. A rotatable thrust bearing 24 and a thrust collar 25 both serving as rotatable thrust sliding surfaces are disposed one on each side of the radial bearing 22 and the stationary thrust bearing 23. The rotatable thrust bearing 24 is fixed to a thrust disk 26 which is fixed to the shaft 7 through a sand collar 27 by a threaded surface and a nut 28 on one end of the shaft 7.

The bearing bracket 21 is inserted in a socket defined in the side frame member 16 with an resilient O-ring 29 interposed therebetween. The bearing bracket 21 is held against the side frame member 16 through a resilient gasket 30. A sleeve 31 is fixed to the shaft 7 and supported by the radial bearing 22, the sleeve 31 and the radial bearing 22 acting as a sliding assembly.

A bearing unit which supports the rotor assembly on a thrust load side, and components associated with such a bearing unit will be described below.

A radial bearing 33 is mounted in a bearing bracket 32. A sleeve 34 is fixed to the shaft 7 and supported by the radial bearing 33, the sleeve 34 and the radial bearing 33 acting as a sliding assembly. The sleeve 34 is axially held against a washer 35 which is fixed to the shaft 7 through the impellers 8 and 9 and a sleeve 42 by a threaded surface and a nut 36 on the other end of the shaft 7. The washer 35 has an outer diameter which is substantially the same as the outer diameter of the radial bearing 33.

The bearing bracket 32 is inserted in a socket defined in the side frame member 15 with a resilient O-ring 37 interposed therebetween. The bearing bracket 32 is held against the side frame member 15.

The full-circumferential-flow in-line pump shown in FIGS. 1 and 2 operates as follows: A fluid drawn from the suction port of the suction-side casing 3 flows into the impeller 8, and then the impeller 9 through the return blade 10a. The fluid is then radially outwardly discharged by the impeller 9, and directed by the guide device 11a to flow axially through an annular fluid passage 40 radially defined between the outer cylinder 2 and the outer frame casing 14. The fluid then flows from the annular fluid passage 40 into the discharge-side casing 5. Thereafter, the fluid is discharged from the discharge port.

In the full-circumferential flow pump of this embodiment, the outer cylinder 2 of the motor stator assembly 1 is extended axially. Thus, the axial depths of the suction-side casing 3 and the discharge-side casing 4 can be made small, and both casings 3 and 4 can be pressed easily.

Figure 3:
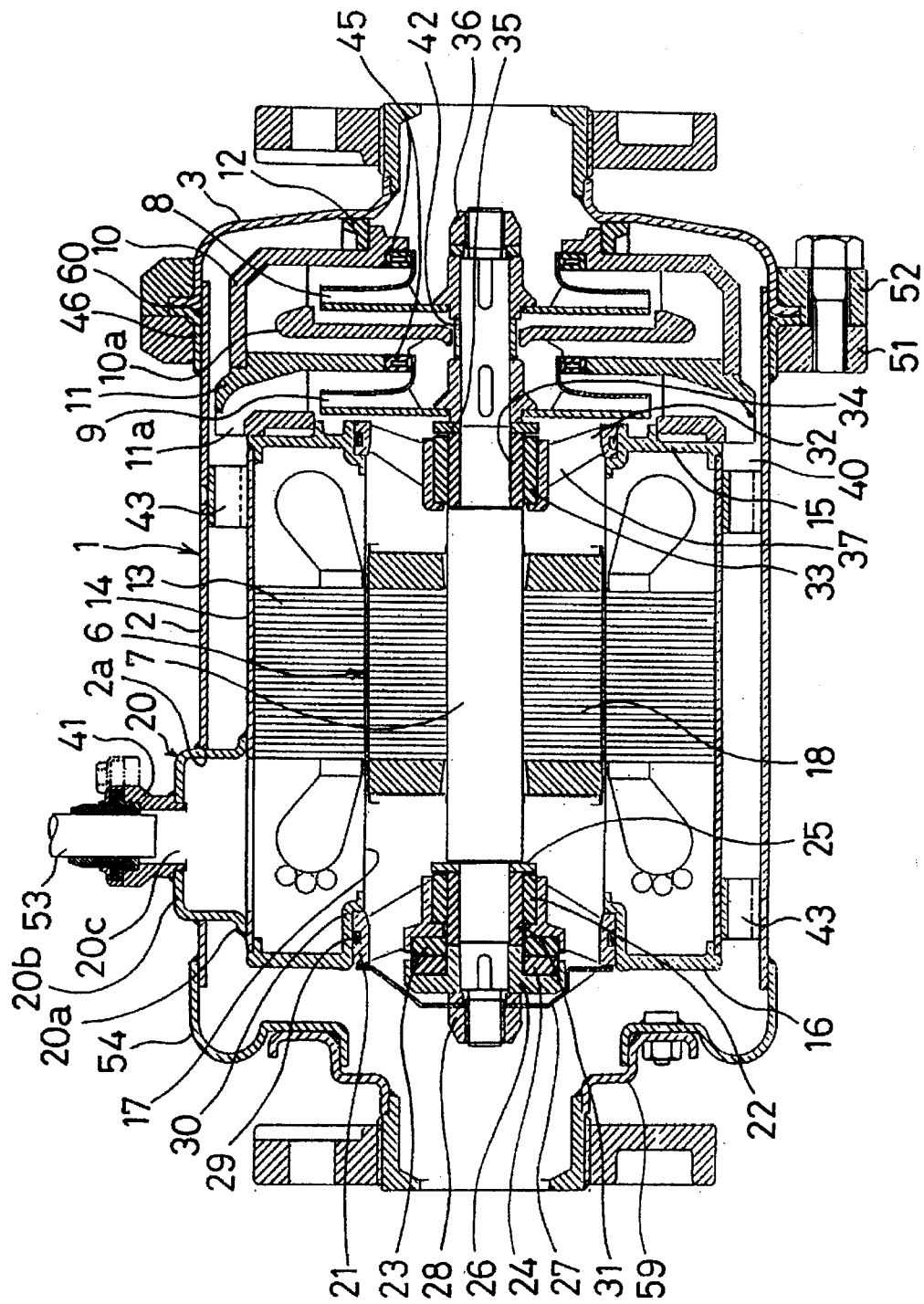
FIG. 3 is a cross-sectional view of a full-circumferential flow pump incorporating a motor stator assembly according to a second embodiment of the present invention.

FIG. 3 shows a second embodiment of a full-circumferential flow pump using a motor stator assembly according to the present invention. In this embodiment, one end of the outer cylinder 2 extends axially. An L-shaped flange 46 is welded to the outer cylinder 2 whose one end extends beyond the L-sharped flange 46. A gasket 60 can be prevented from slipping off by the extended end portion of the outer cylinder 2 upon attachment of the pump components. A fixing member 54 extending inward of the outer cylinder 2 is fixedly welded to the other end of the outer cylinder 2. A discharge cover 59 is secured to the fixing member 54 by welding. The fixing member 54 and the discharge cover 59 jointly serve as a discharge-side casing. The other structure is the same as that of FIG. 1.

Figure 4:
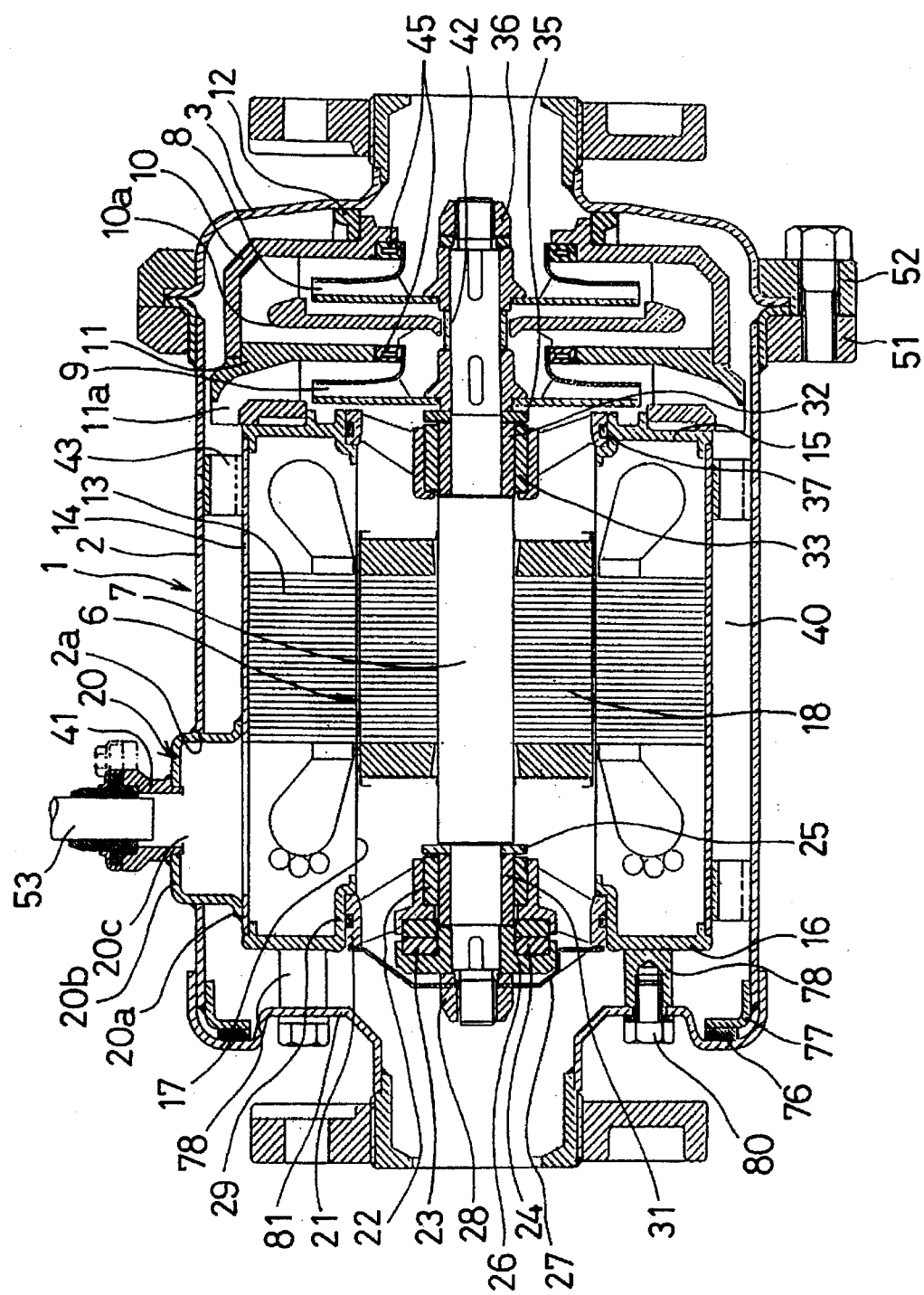
FIG. 4 is a cross-sectional view of a full-circumferential flow pump incorporating a motor stator assembly according to a third embodiment of the present invention.

FIG. 4 shows a third embodiment of a full-circumferential flow pump using a motor stator assembly according to the present invention. In this embodiment, an L-shaped member 77 holding a gasket 76 is secured to one end of the outer cylinder 2 of the motor stator assembly 1 by welding. A plurality of stays 78 are fixed to the side frame member 16, and a discharge cover 81 is fixed to the stays 78 by bolts 80. The L-shaped member 77 and the discharge cover 81 jointly serve as a discharge-side casing. The other structure is the same as that of FIG. 2.

Figure 5:
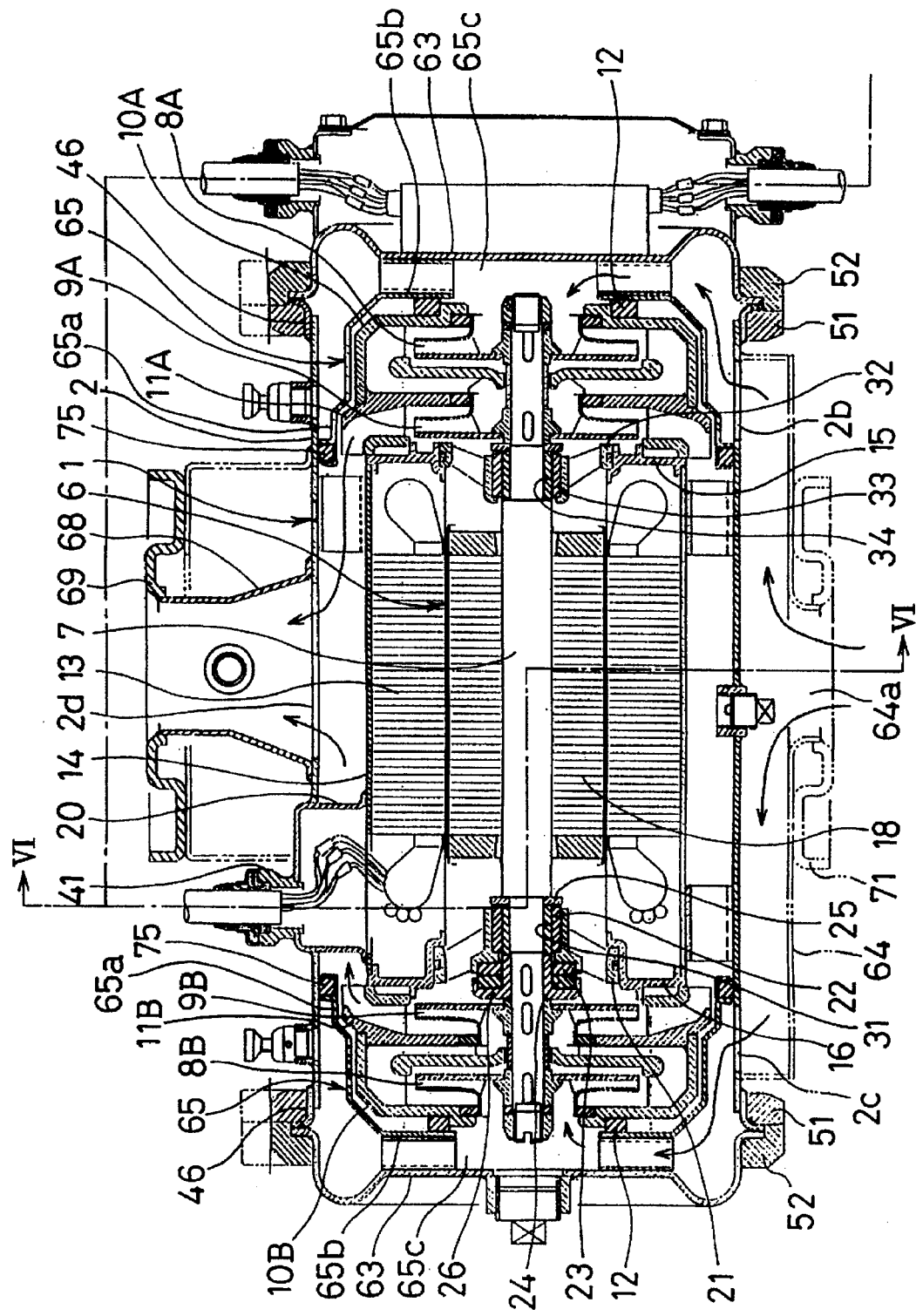
FIG. 5 is a cross-sectional view of a full-circumferential flow pump incorporating a motor stator assembly according to a fourth embodiment of the present invention.
Figure 6:
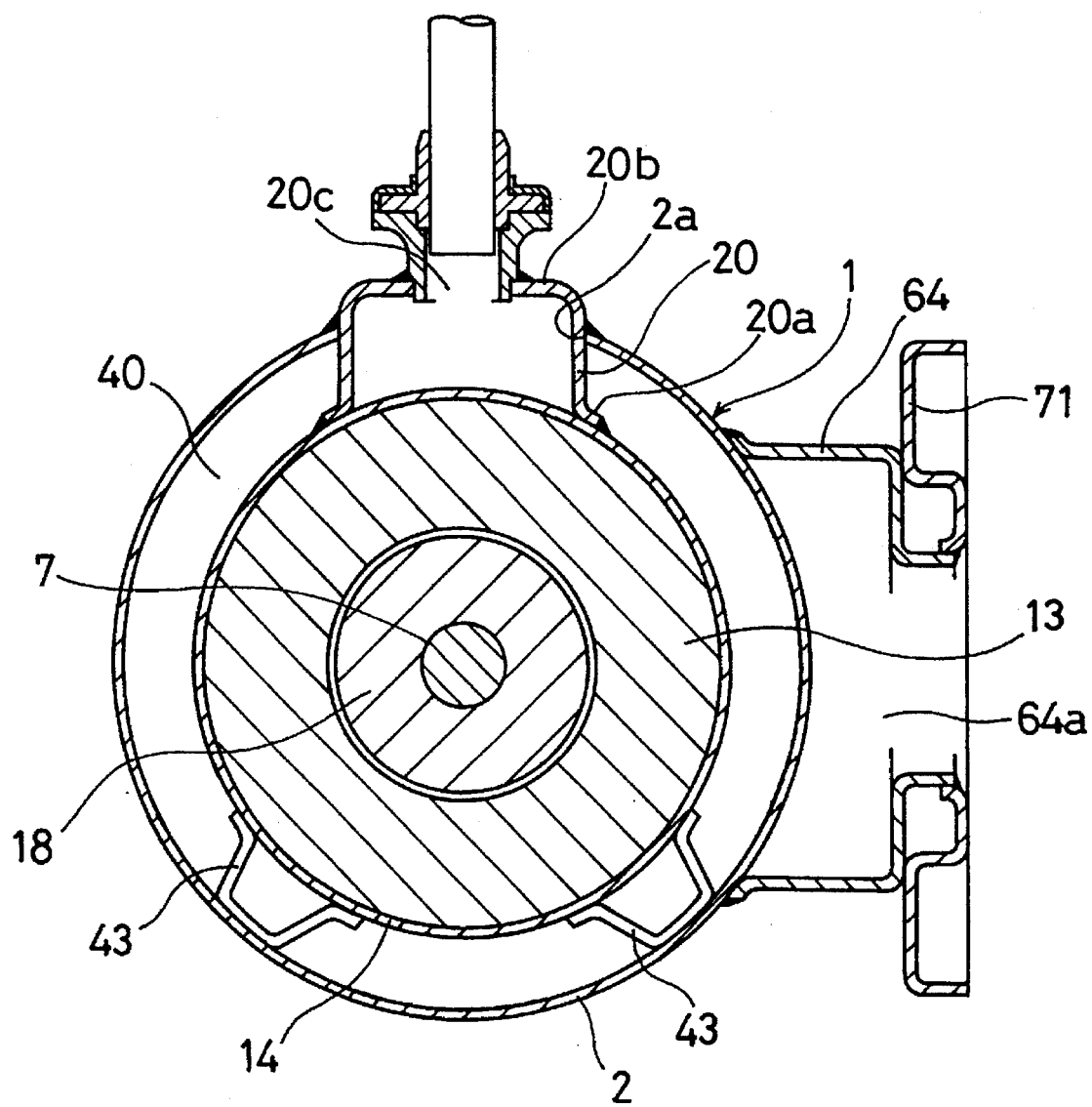
FIG. 6 is a cross-sectional view taken along line VI—VI of FIG. 5.

FIGS. 5 and 6 show a fourth embodiment of a full-circumferential flow pump using a motor stator assembly according to the present invention. The full-circumferential flow pump of this embodiment is of a double suction type. The elements shown in FIG. 5 which are identical to those of FIG. 1 are denoted by identical reference numerals.

The full-circumferential flow pump of double suction type has a motor stator assembly 1 at a central position thereof as shown in FIG. 5. Impellers 8A and 9A and 8B and 9B each having a suction port opened axially outward are fixed to the respective ends of the main shaft 7 of a rotor assembly 6. A cable housing 20 is fixed to the outer frame casing 14 by welding. Covers 63 are fixed by flanges 51 and 52 to the outer ends of corresponding L-shaped flanges 46 secured to the both ends of an outer cylinder 2, respectively. In the vicinity of the both ends of the outer cylinder 2, there are provided suction windows 2b and 2c which are connected by a suction cover 64. The suction cover 64 is connected to the outer cylinder 2 as shown in FIG. 6. A pump suction port 64a is formed in the central potion of the suction cover 64, and a suction flange 71 is fixed thereto.

Partition members 65 each having substantially cylindrical receptacle shape are fixedly provided in the outer cylinder 2. Seal members 75 are fixed to the respective flange portions 65a of the partition members 65, and a suction opening 65c is formed in the bottom portion 65b of each of the partition members 65. In the interiors of the partition members 65, there are provided first inner casings 10A and 10B and second inner casings 11A and 11B, respectively. A discharge port 2d is formed in the central portion of the outer cylinder 2, and a discharge nozzle 68 is connected thereto. A discharge flange 69 is integrally fixed to the discharge nozzle 68. The other structure is the same as that of FIG. 1.

The full-circumferential-flow double suction pump shown in FIGS. 5 and 6 operates as follows: A fluid which is drawn in through the suction port 64a is divided by the suction cover 64 into two fluid flows which are introduced into the pump assemblies through the suction windows 2b, 2c. The fluid flows introduced into the pump assemblies flow through the suction openings 65c, 65c into the first inner casings 10A, 10B and the second inner casings 11A, 11B in which the fluid flows are pressurized by the impellers 8A, 8B, 9A, 9B. The fluid flows discharged from the impellers 8A, 8B flow into the impellers 9A, 9B, from which the fluids flow radially outwardly through the guide devices and then axially into the annular space or passage 40 defined between the outer cylinder 2 and the outer frame casing 14. The fluid flow passing through the annular passage 40 merges in the middle of the annular passage 40 and is then discharged through the opening 2d of the outer cylinder 2 and the discharge nozzle 68 from the discharge port.

Next, a method of manufacturing a motor stator assembly used in a full-circumferential flow pump in FIGS. 1 through 6 will be described below with reference to FIGS. 7 to 11.

Figure 7A:
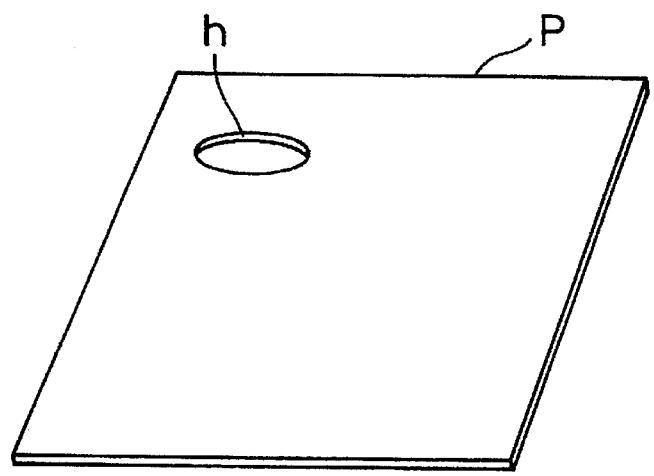
FIG. 7A is a perspective view showing the manner in which the motor stator assembly is manufactured.

(1) As shown in FIG. 7A, a flat sheet metal P for a motor frame is formed with a hole h for cable connection.

Figure 7B:
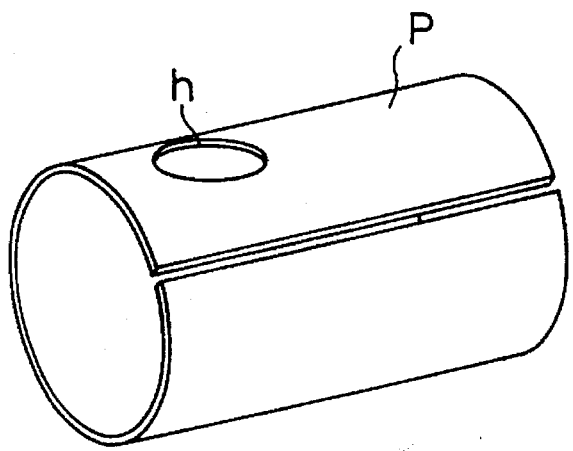
FIG. 7B is a perspective view showing the manner in which the motor stator assembly is manufactured.

(2) As shown in FIG. 7B, the flat sheet metal P is wound in such a state that both ends of the cylindrical sheet metal are not connected with each other.

Figure 7C:
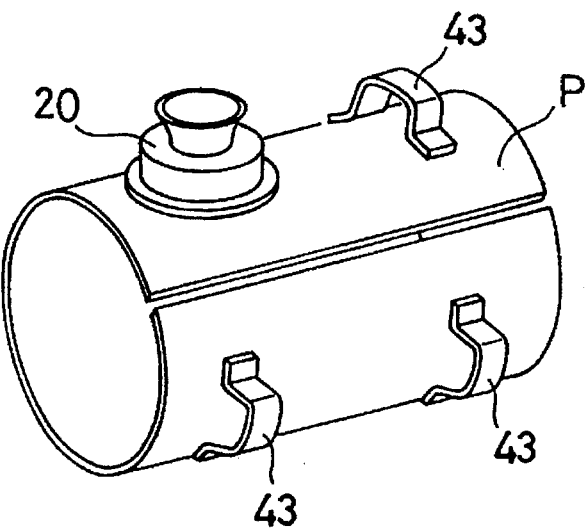
FIG. 7C is a perspective view showing the manner in which the motor stator assembly is manufactured.

(3) As shown in FIG. 7C, a cable housing 20 for connecting leads of a coil to an electric power supply cable and a plurality of stays 43 are welded to the wound cylindrical sheet metal P.

Figure 8A:
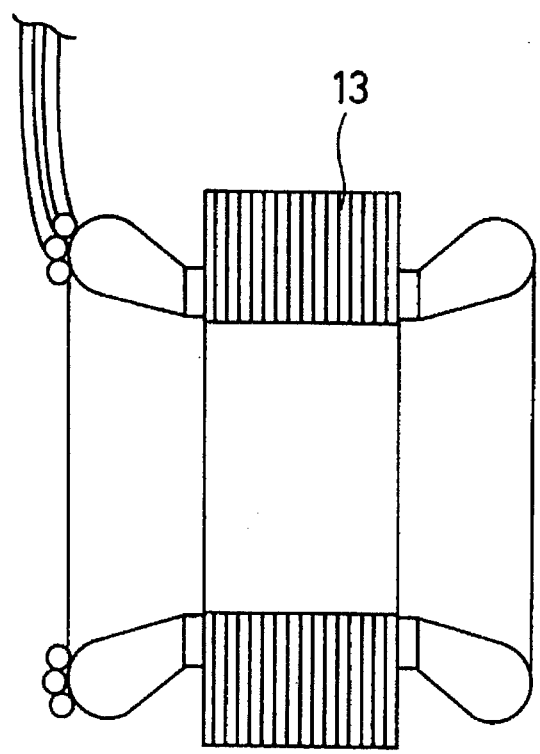
FIG. 8A is a cross-sectional view showing the manner in which the motor stator assembly is manufactured.
Figure 8B:
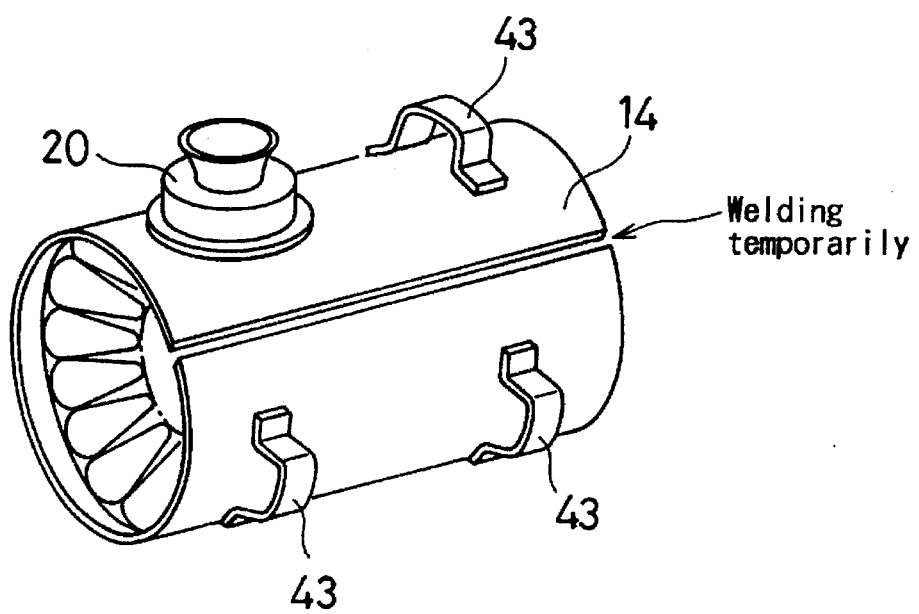
FIG. 8B is a perspective view showing the manner in which the motor stator assembly is manufactured.

(4) A motor stator 13 is prepared as shown in FIG. 8A, and the motor stator 13 is inserted into the wound cylindrical sheet metal P as shown in FIG. 8B. The winding starting end and the winding terminating end are temporarily welded together to form an outer frame casing 14.

Figure 9A:
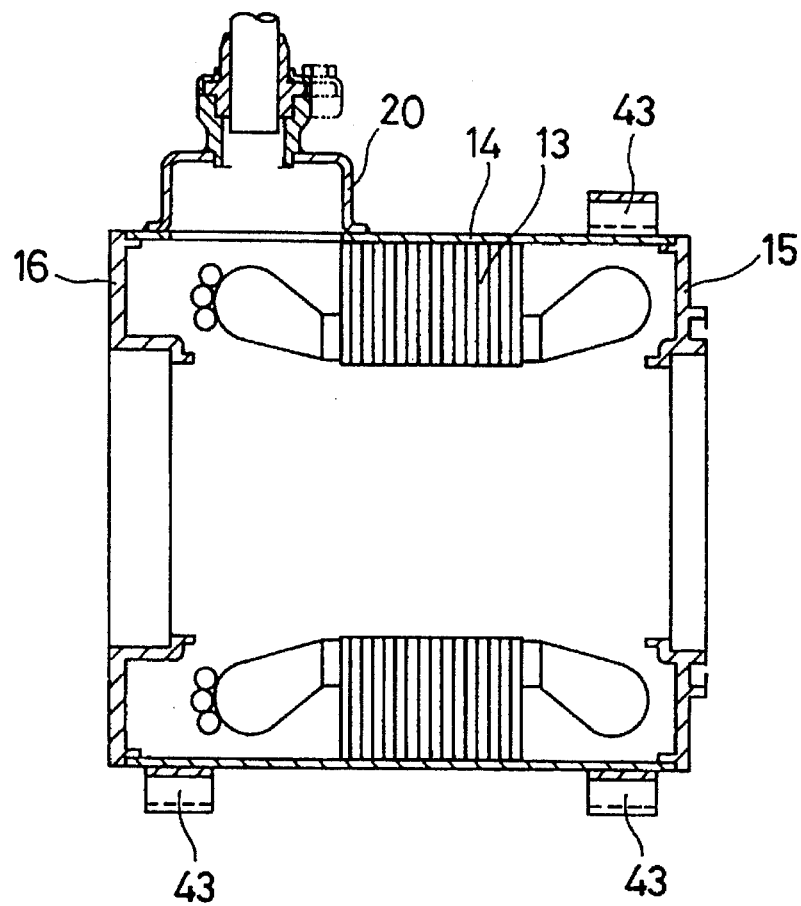
FIG. 9A is a cross-sectional view showing the manner in which the motor stator assembly is manufactured.

(5) As shown in FIG. 9A, side frame members 15 and 16 are fitted in both open ends of the outer frame casing 14.

Figure 9B:
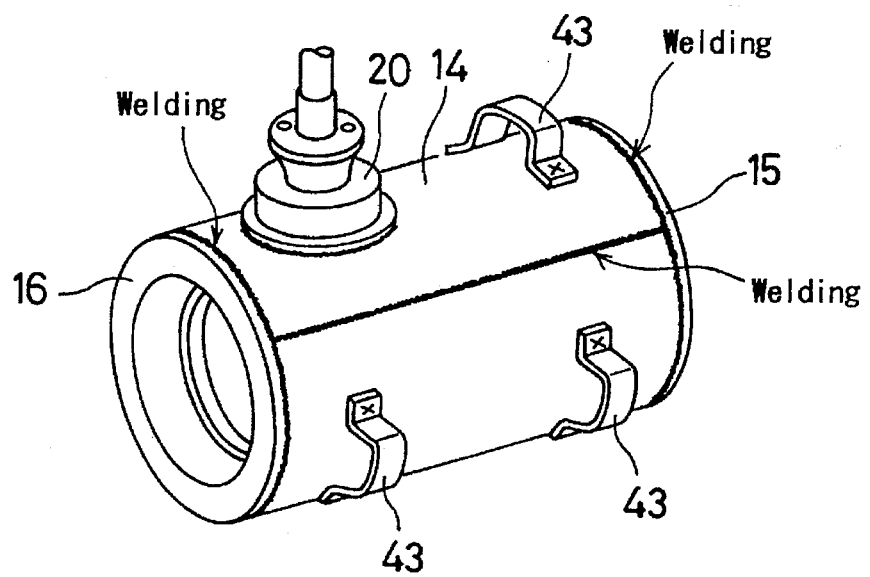
FIG. 9B is a perspective view showing the manner in which the motor stator assembly is manufactured.

(6) As shown in FIG. 9B, the ends which has been temporarily welded in the step (4) are welded together finally, and the side frame members 15 and 16 are welded to the outer frame casing 14 finally.

Figure 10A:
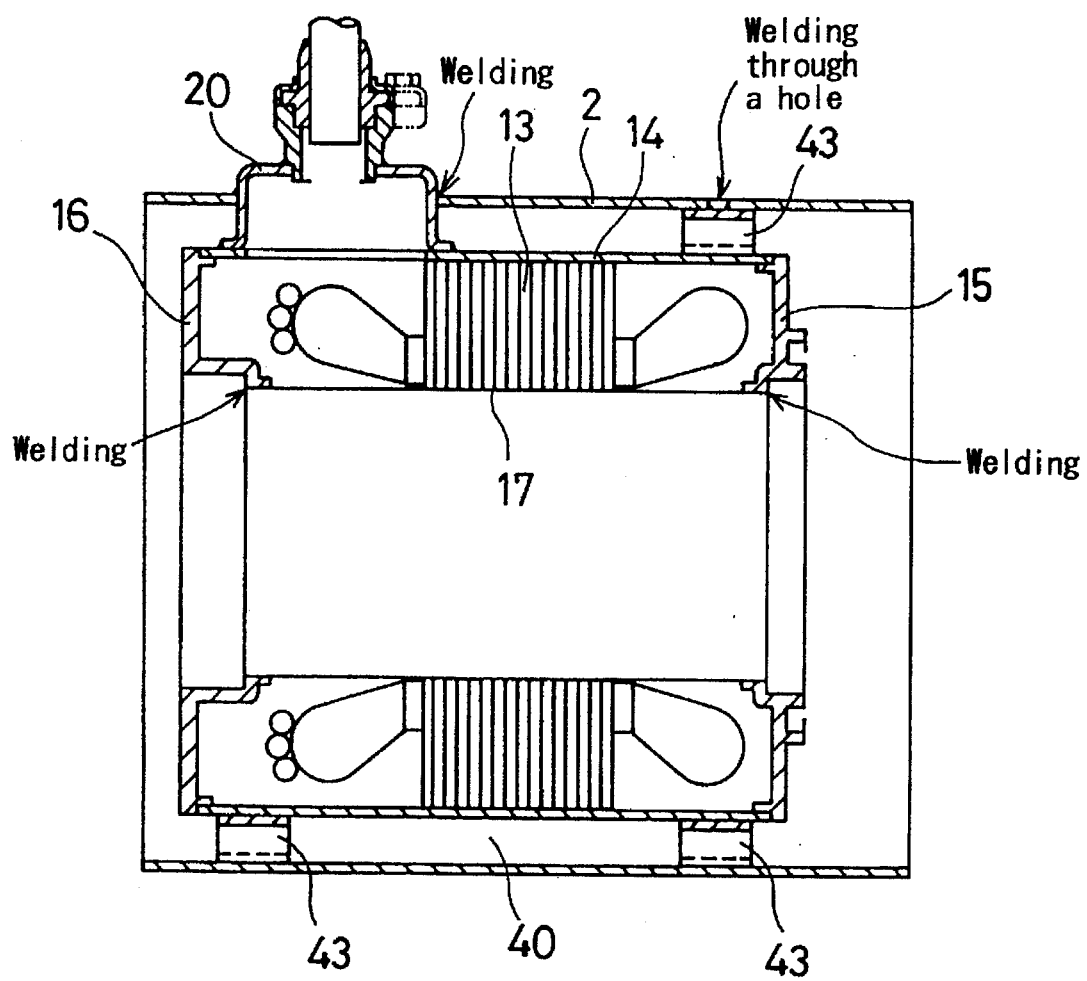
FIG. 10A is a cross-sectional view showing the manner in which the motor stator assembly is manufactured.

(7) As shown in FIG. 10A, a can 17 is inserted into the motor stator 13, and both ends of the can 17 are welded to the side frame members 15 and 16, respectively.

Figure 10B:
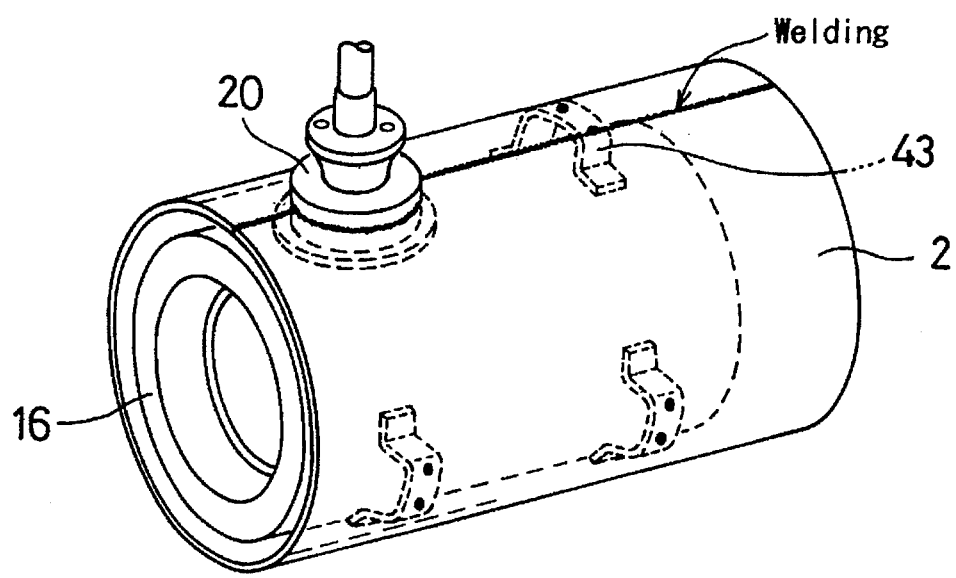
FIG. 10B is a perspective view showing the manner in which the motor stator assembly is manufactured.

(8) As shown in FIGS. 10A and 10B, the flat sheet metal P for the outer cylinder in which a hole is previously formed at a predetermined position is wound around the outer frame casing frame 14 having the stays 43, and then the winding starting end and the winding terminating end are welded together, thereby forming the outer cylinder 2.

Figure 11:
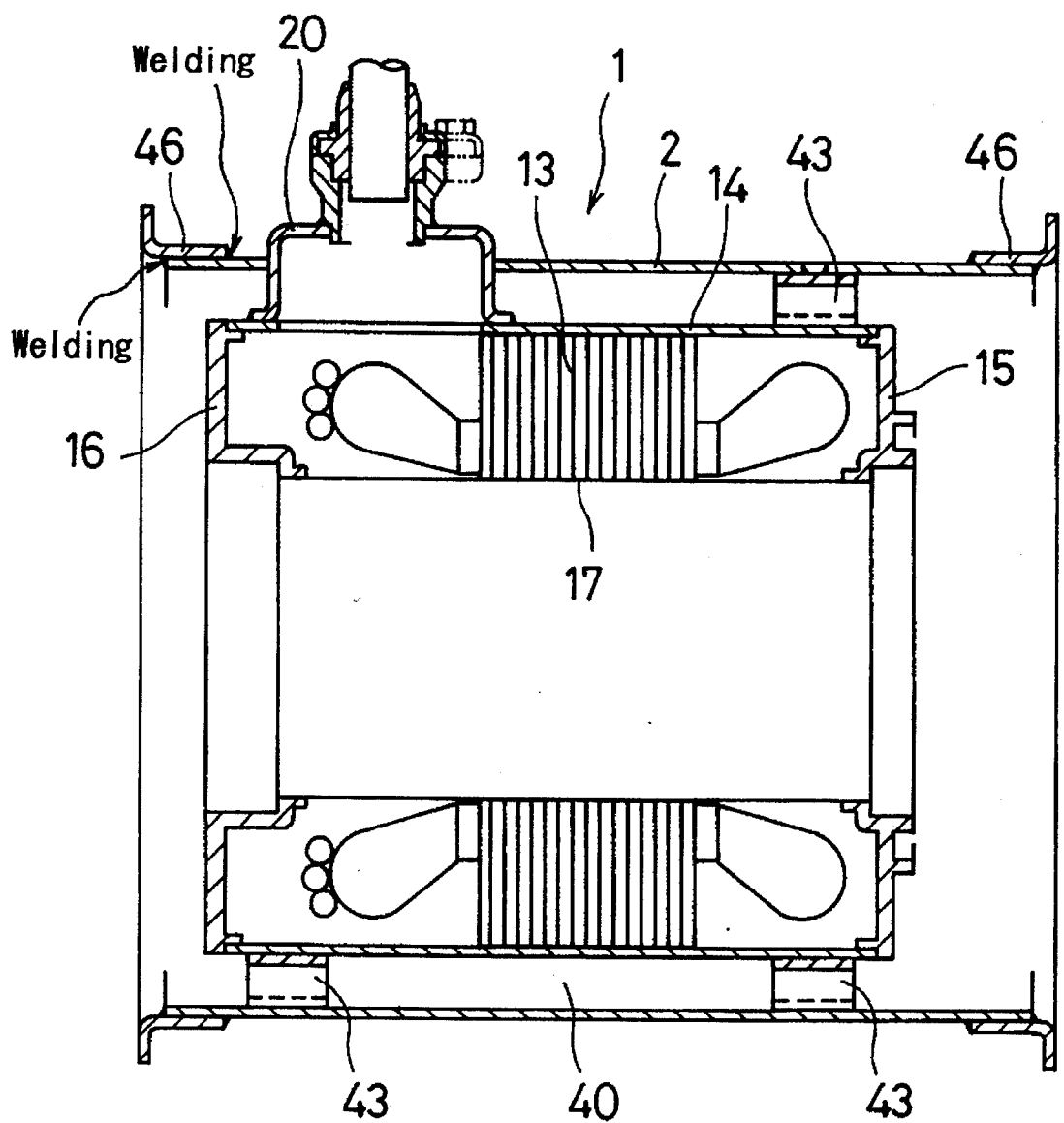
FIG. 11 is a cross-sectional view showing the manner in which the motor stator assembly is manufactured.

(9) As shown in FIGS. 10A and 10B, the cable housing 20 is hermetically welded to the outer cylinder 2, and the outer cylinder 2 is welded to the stays 43 through holes formed in the outer cylinder 2. Next, as shown in FIG. 11, L-shaped flanges 46 are welded to both ends of the outer cylinder 2. In this manner, a motor stator assembly 1 is completely assembled.

In the motor stator assembly 1 of the present invention, projections comprising the stays 43 are provided on the outer circumferential wall of the outer frame casing 14. After winding a sheet metal around the projections comprising the stays 43, the winding starting end and the winding terminating end are connected together to form the outer cylinder 2. The annular space 40 is defined between the outer cylinder 2 and the outer frame casing 14. Thus, the outer cylinder 2 can be elongated in the axial directions so as to cover the end portions of the motor frame including the outer frame casing 14 and the side frame members 15 and 16.

Since the cable housing 20 for connection to the electrical power supply is used as one of the projections, the number of the projections used only for connection of the outer cylinder 2 and the outer frame casing 14 can be reduced. Due to the fact that the outer cylinder 2 can be attached to the outer frame casing 14 even if the cable housing 20 projects radially greatly in this embodiment, the ample space for effecting lead connection is obtained in the cable housing 20. Thus, a separate terminal box is not required.

The cable housing 20 is located between the winding starting end and the winding terminating end of the outer cylinder 2 in this embodiment. This arrangement reduces the welded portions and facilitates the winding process of the outer cylinder 2 around the outer frame casing 14 of the motor frame. After the outer cylinder 2 is wound around the outer frame casing 14 and the related portions are welded together, the L-shaped flanges 46 serving as pump fixing means are fixed to both ends of the outer cylinder 2.

As a result, distortions generated from other welding processes do not affect the flanges 46. When the L-shaped flanges 46 overlap with and are fixed to the outer cylinder 2, the positions of the L-shaped flanges 46 during a overlapping process can be adjusted by moving the L-shaped flanges 46 axially. Thus, the whole length of the outer cylinder 2 is not required to be controlled strictly, and hence the outer cylinder 2 can be manufactured easily.

In case of incorporating the motor stator assembly 1 into the full-circumferential flow pump of a double suction type, since the outer cylinder 2 can be elongated axially, the suction windows 2b and 2c can be formed in the outer cylinder 2, and thus the pump has a very simple structure.

As described above, the motor stator assembly according to the present invention has projections formed on the outer circumferential wall of the outer frame casing. After the outer cylinder made of sheet metal is wound to surround the projections, the winding starting end and the winding terminating end of the outer cylinder are connected together directly or by means of a separate member.

With this arrangement, the outer cylinder can be elongated axially so as to cover the end portions of the motor frame. As a result, the motor stator assembly according to the present invention can be applied to many types of pumps and can be manufactured at high productivity. In a full-circumferential flow pump of an in-line type, the depths of the suction-side casing and the discharged-side casing can be made small, and the pump can be manufactured easily. In a pump of a double suction type, suction windows can be formed in the elongated outer cylinder, and the pump can be manufactured easily.

Next, a method of manufacturing a full-circumferential flow pump of FIG. 1 incorporating the motor stator assembly 1 will be described below.

The main shaft 7 to which the rotor 18 and the bearing unit of an anti-thrust load side are attached is inserted into the motor stator assembly 1. Thereafter, the impellers 8 and 9 and the bearing unit of a thrust load side are attached to the main shaft 7, and the first and second inner casings 10 and 11 are assembled.

Next, the suction-side casing 3 is fixed to the outer cylinder 2 with the resilient seal 12 interposed between the suction-side casing 3 and the first inner casing 10 by the flanges 51 and 52. Leads of the stator 13 and the cable are connected, and connecting portion thereof are housed in the cable housing 20. In the above manner, the full-circumferential flow pump is completely assembled.

Next, another method of manufacturing a motor stator assembly used in a full-circumferential flow pump in FIGS. 1 through 6 will be described below with reference to FIG. 12.

Figure 12A:
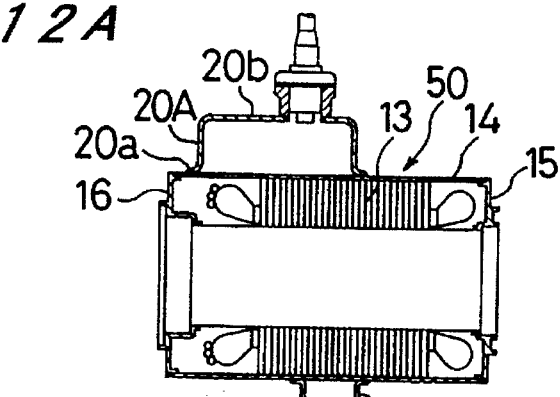
FIG. 12A is a cross-sectional view showing the manner in which the motor stator assembly is manufactured.

As shown in FIG. 12A, an assembly 50 including the stator 13, the outer frame casing 14, the side frame members 15 and 16, the can 17 and the cable housing 20A is formed in the same steps as the steps (1) through (7) shown in FIGS. 7 through 10.

Figure 12B:
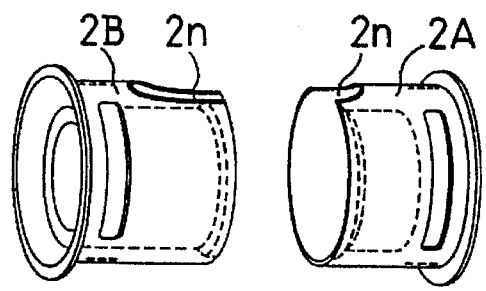
FIG. 12B is a perspective view showing the manner in which the motor stator assembly is manufactured.
Figure 12C:
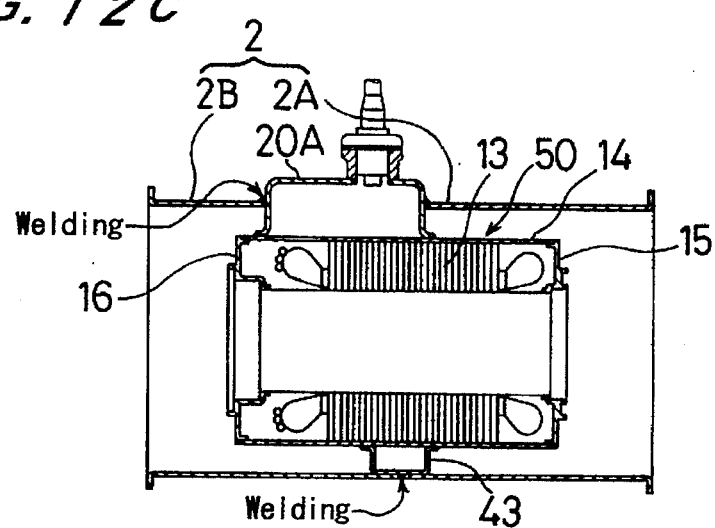
FIG. 12C is a cross-sectional view showing the manner in which the motor stator assembly is manufactured.
Figure 12D:
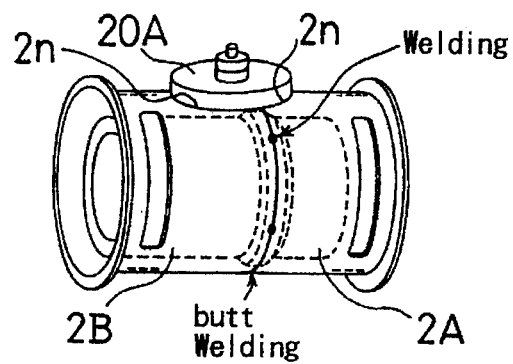
FIG. 12D is a perspective view showing the manner in which the motor stator assembly is manufactured.

Next, two cylindrical members 2A and 2B are prepared as shown in FIG. 12B. The cylindrical members 2A and 2B has a notch 2n having a substantially semicircular shape, respectively. Thereafter, as shown in FIGS. 12C and 12D, the cylindrical members 2A and 2B are fitted over the assembly 50 of FIG. 12A. At this time, the notches 2n of the respective cylindrical members 2A and 2B are fitted over the cable housing 20A.

Next, the cable housing 20A and the cylindrical members 2A and 2B are hermetically welded together, and the cylindrical members 2A and 2B are hermetically welded together by butt welding, thereby forming the outer cylinder 2. Further, the outer cylinder 2 and the stays 43 are welded together. In this manner, the motor stator assembly 1 is completely assembled.

Figure 13:
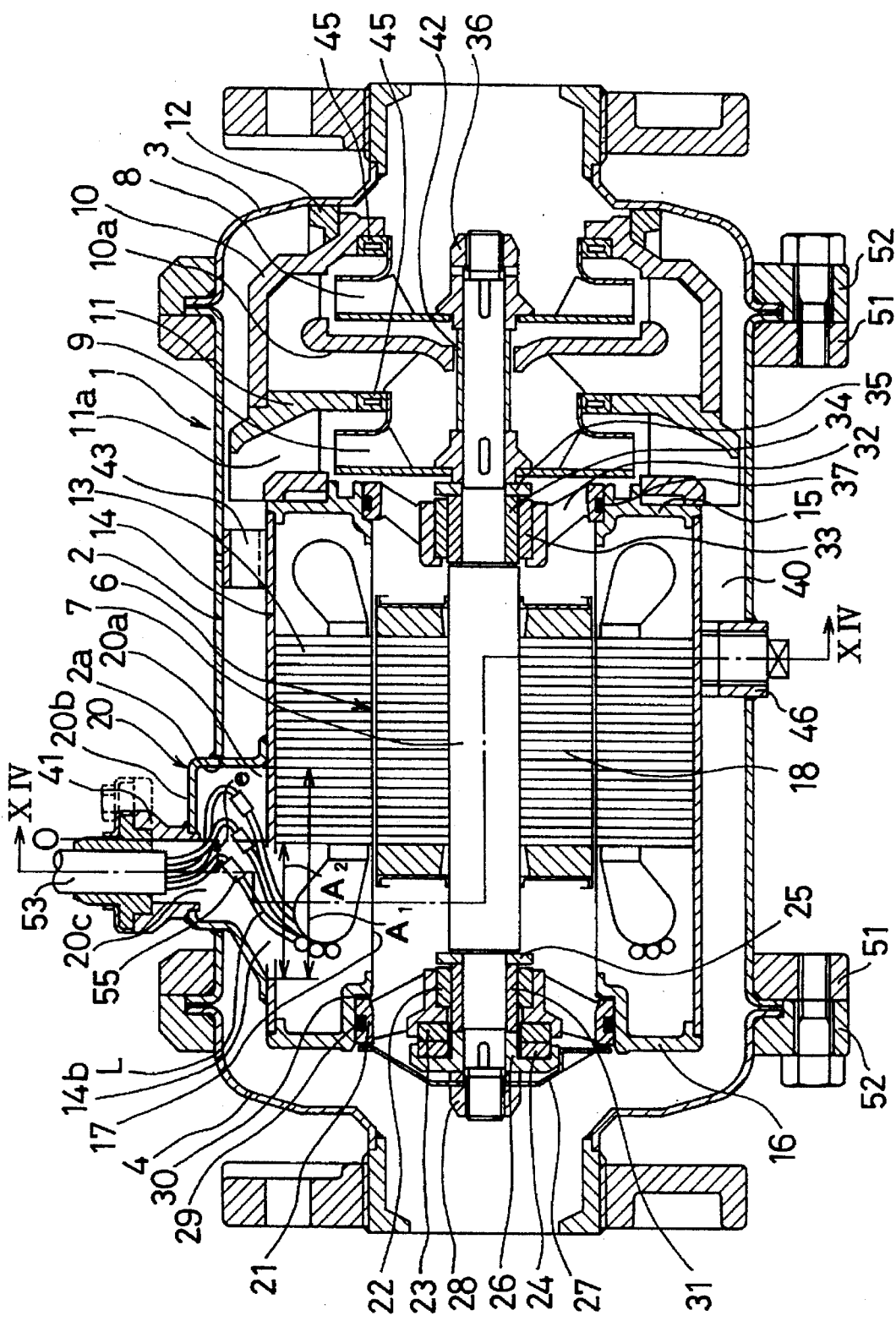
FIG. 13 is a cross-sectional view of a full-circumferential flow pump according to a fifth embodiment of the present invention.
Figure 14:
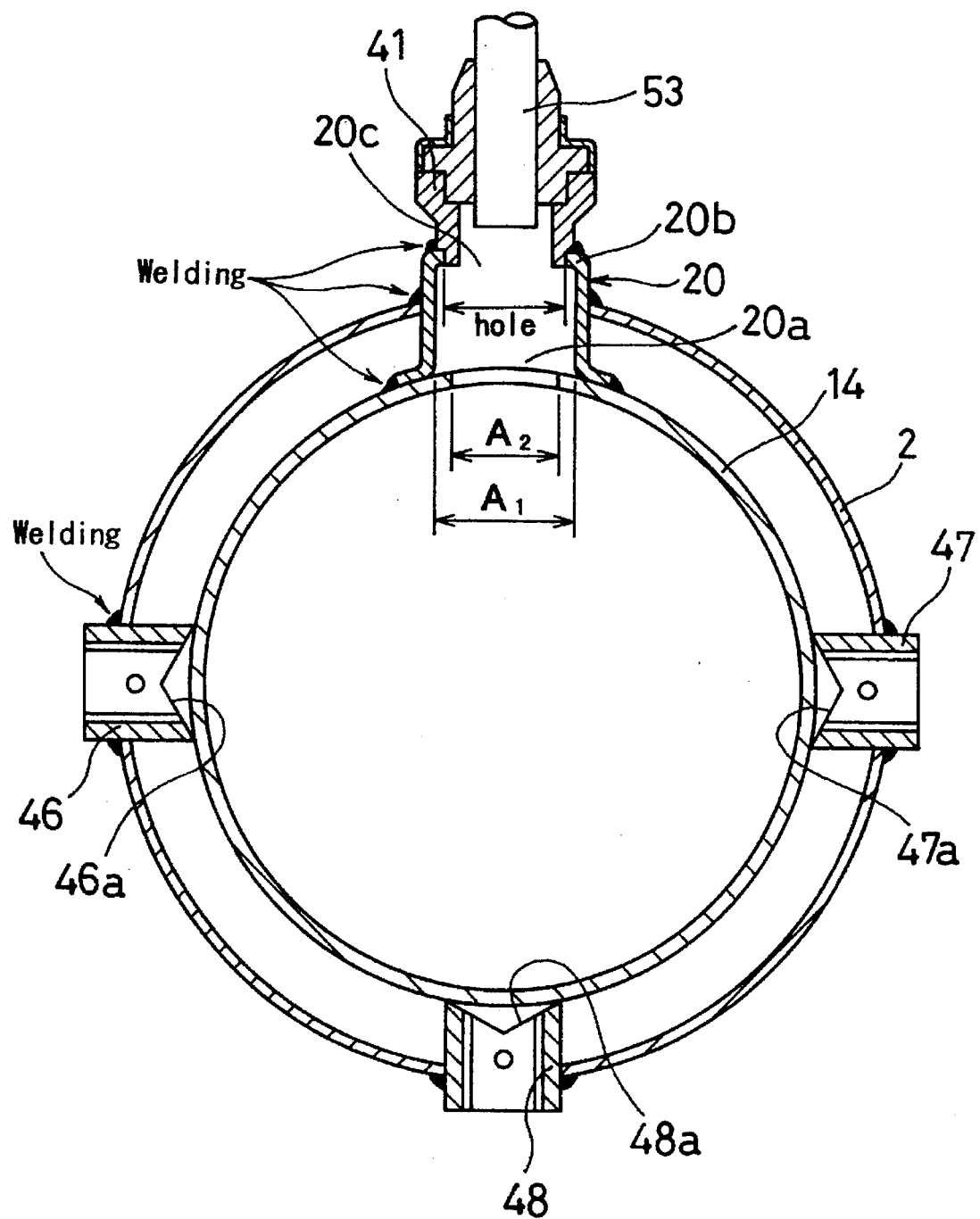
FIG. 14 is a cross-sectional view taken along line XIV—XIV of FIG. 13.

FIGS. 13 and 14 show a sixth embodiment of a full-circumferential flow pump using a motor stator assembly according to the present invention. The full-circumferential flow pump of this embodiment is of an in-line type.

The full-circumferential flow pump comprises a motor stator assembly 1, a rotor assembly 6 supported by the motor stator assembly 1, a pump assembly including impellers 8 and 9 fixed to a main shaft 7 of the rotor assembly 6, and pump components fixed to the both ends of the motor stator assembly 1. The motor stator assembly 1 includes a stator 13, an outer frame casing 14 fitted over the stator 13, side frame members 15, 16 welded to respective open ends of the outer frame casing 14, and a can 17 fitted in the stator 13 and welded to the side frame members 15, 16. The motor stator assembly 1 further includes an outer cylinder 2 provided around the outer frame casing 14. An annular space 40 is defined between the outer frame casing 14 and the outer cylinder 2. The pump components include a discharge-side casing 4 and a suction-side casing 3 connected to the respective ends of the outer cylinder 2 by flanges 51 and 52. The outer cylinder 2, the suction-side casing 3 and the discharge-side casing 4 are made of sheet metal such as stainless steel and jointly serve as a pump casing.

The first-stage impeller 8 is housed in a first inner casing 10 having a return blade 10a, and the second-stage impeller 9 is housed in a second inner casing 11 having a guide device 11a. A resilient seal 12 is interposed between the first inner casing 10 and the suction-side casing 3. Liner rings 45 are provided on the respective inner ends of the first and second inner casings 10 and 11.

The rotor assembly 6 comprises a rotor 18 fitted on the main shaft 7, and thrust load side and anti-thrust load side bearing units for supporting the main shaft 7.

The outer cylinder 2 has a hole 2a in which a cable housing 20 is provided. The cable housing 20 is in the form of receptacle-like body having an open end 20a and a bottom 20b and is fixed at the open end 20a to the outer frame casing 14 by welding. The outer cylinder 2 and the cable housing 20 are hermetically welded together. A cable connector 41 for holding a cable 53 is inserted in a lead hole 20c formed in the bottom 20b of the cable housing 20, and the cable connector 41 and the cable housing 20 are welded and fixed together.

The cable housing 20 has an oblong cross section which is long in an axial direction of the motor stator assembly 1 and short in a circumferential direction of the motor stator assembly 1. The center of the hole 20c is away from the center of the oblong cross section by a distance "e". Therefore, an area of the annual passage 40 between the outer frame casing 14 and the outer cylinder 2 is not reduced so much. An area $A_1$ of the open end 20a of the cable housing 20 is larger than an area $A_2$ of a lead hole 14b of the outer frame casing 14. Thus, contact area between the stator 13 and the outer frame casing 14 is not reduced and a wide space for housing leads of motor can be obtained.

Figure 2:
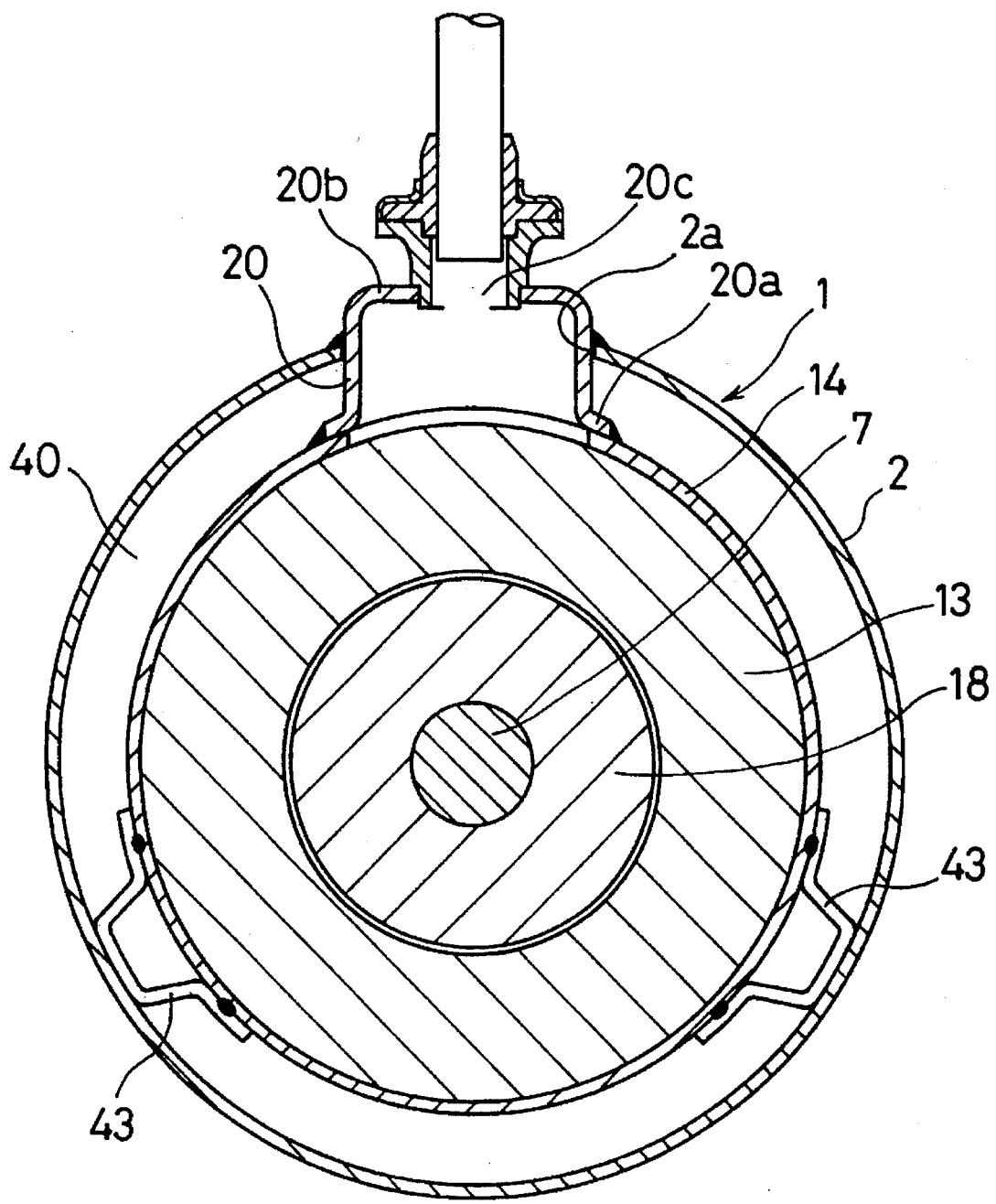
FIG. 2 is a cross-sectional view taken along line II—II of FIG. 1.

Bearing units which support the rotor assembly on antithrust and thrust load sides are the same as the first embodiment in FIGS. 1 and 2.

As shown in FIG. 14, a drain pipe 46 having a notch 46a, an air vent pipe 47 having a notch 47a and a gauge attachment pipe 48 having a notch 48a are welded to the outer cylinder 2 in such a state that the notches 46a, 47a and 48a of the pipes 46, 47 and 48 are engaged with the outer frame casing 14. Since the forward ends of the pipes 46, 47 and 48 bite the outer frame casing 14, the outer frame casing 14 is fixedly secured to the outer cylinder 2.

Figure 15:
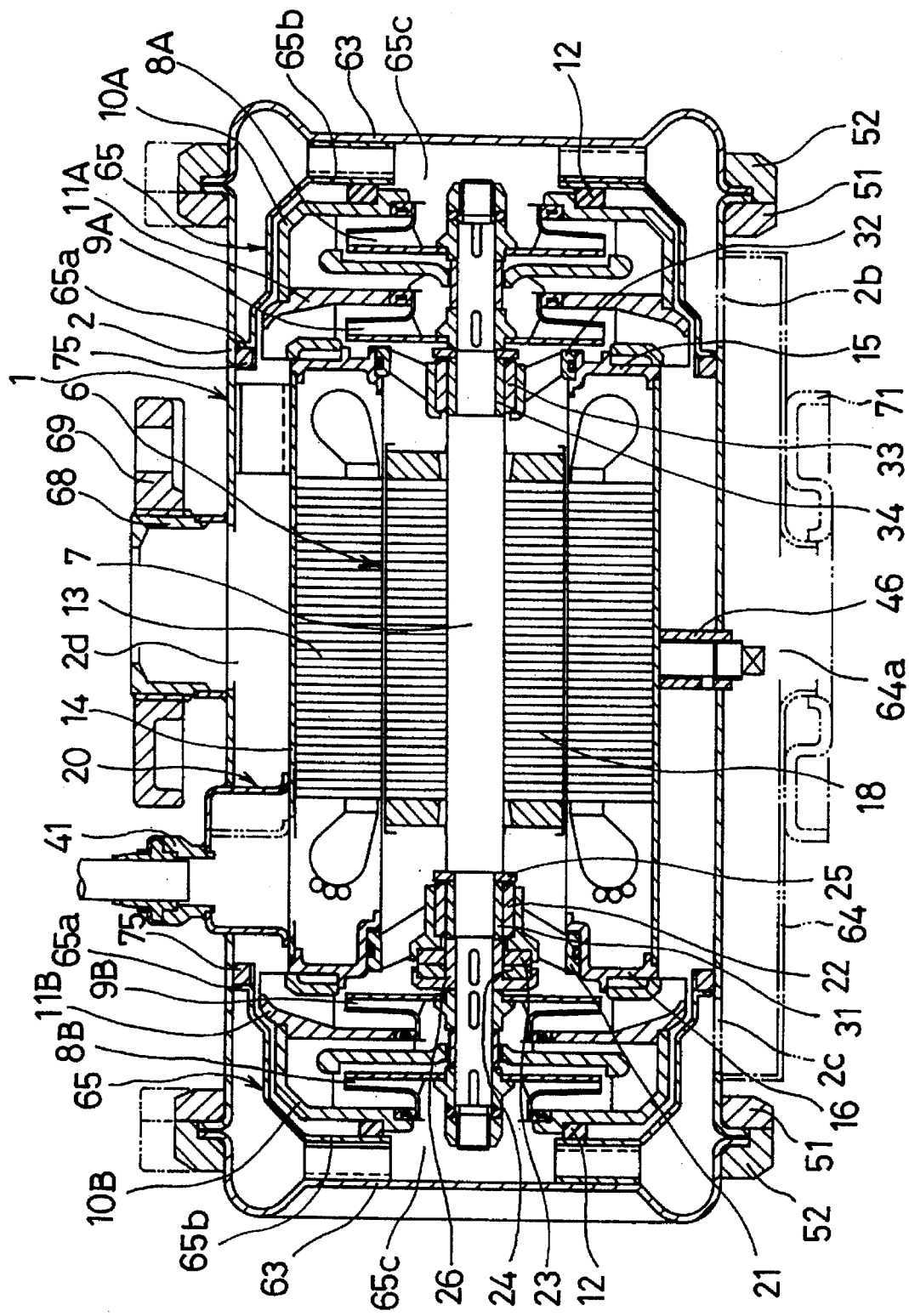
FIG. 15 is a cross-sectional view of a full-circumferential flow pump according to a sixth embodiment of the present invention.

FIG. 15 shows a seventh embodiment of a full-circumferential flow pump using a motor stator assembly according to the present invention. The full-circumferential flow pump of this embodiment is of a double suction type.

The full-circumferential flow pump of double suction type has a motor stator assembly 1 at a central part thereof as shown in FIG. 15. Impellers 8A and 9A and 8B and 9B each having a suction port opened axially outward are fixed to the respective ends of the main shaft 7 of a rotor assembly 6 supported by the motor stator assembly 1. A cable housing 20 is fixed to the outer frame casing 14. Covers 63 are fixed by flanges 51 and 52 to the respective ends of an outer cylinder 2. In the vicinity of both ends of the outer cylinder 2, there are provided suction windows 2b and 2c which are connected by a suction cover 64. The suction cover 64 is connected to the outer cylinder 2 in the same manner as FIG. 6. A pump suction port 64a is formed in the central potion of the suction cover 64 and a suction flange 71 is fixed thereto.

Partition members 65 each having substantially cylindrical receptacle shape are fixedly provided in the outer cylinder 2. Seal members 75 are fixed to the respective flange portions 65a of the partition members 65. A suction opening 65c is formed in the bottom portion of each of the partition members 65. In the interiors of the partition members 65, there are provided first inner casings 10A and 10B and second inner casings 11A and 11B, respectively. A discharge port 2d is formed in the central portion of the outer cylinder 2 and an discharge nozzle 68 is connected thereto. A discharge flange 69 is integrally fixed to the discharge nozzle 68. The other structure is the same as that of FIG. 5.

Next, a method of manufacturing a motor stator assembly used in a full-circumferential flow pump in FIGS. 13 through 15 will be described below with reference to FIG. 16.

Figure 16:
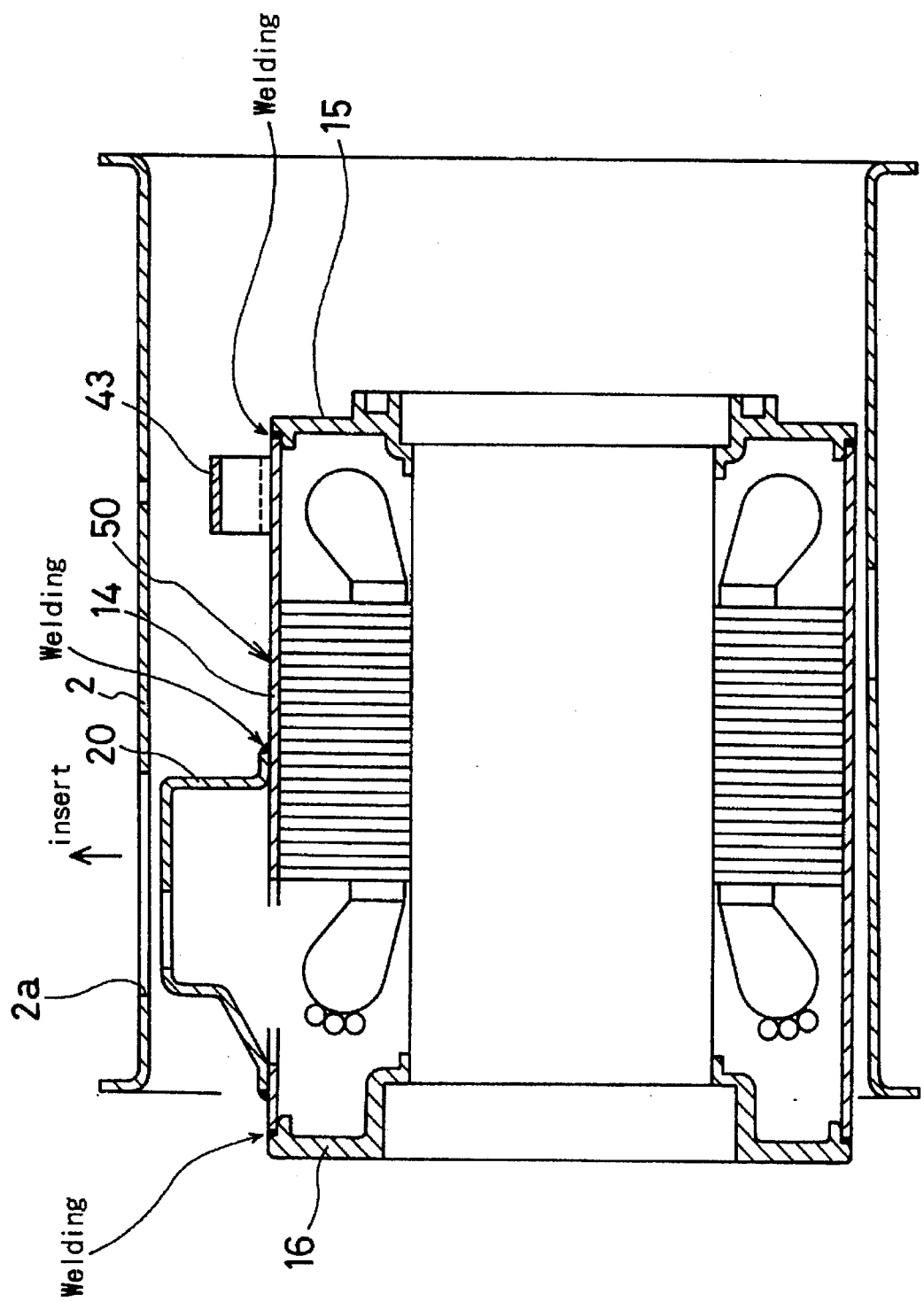
FIG. 16 is a cross-sectional view showing the manner in which the motor stator assembly is manufactured.

First, as shown in FIG. 16, the side frame members 15 and 16 are welded to the outer frame casing 14, the cable housing 20 is hermetically welded to the outer frame casing 14, and the stays 43 are welded to the outer frame casing 14, thereby forming an assembly 50.

Next, the assembly 50 is inserted into the outer cylinder 2 having the hole 2a, the cable housing 20 is caused to pass through the hole 2a, and then the cable housing 20 is hermetically welded to the outer cylinder 2. Thereafter, the drain pipe 46, the air vent pipe 47 and the gauge attachment pipe 48 are welded to the outer cylinder in such a state that the notches 46a, 47a and 48a of the pipes 46, 47 and 48 are engaged with the outer frame casing 14. Thus, the forward ends of the pipes 46, 47 and 48 bite the outer frame 14, and the outer frame casing 14 is fixedly secured to the outer cylinder 2 as shown in FIG. 14. In this manner, the motor stator assembly 1 is completely assembled.

According to the embodiments in FIGS. 13 through 16, the cable housing 20 is provided by making use of the annular space 40, and leads of the motor is housed in the cable housing 20. Therefore, it is not necessary to install a terminal box on the outer cylinder 2, and there is no member which projects from the outer cylinder 2, thus making the pump small in size and saving an installation space of the pump.

Further, the cable housing 20 has a receptacle-like body having an oblong cross section which is long in an axial direction of the motor and short in a circumferential direction of the motor. Thus, an area of the annual passage 40 is not reduced so much, and fluid loss or loss of head caused by a collision of fluid with the cable housing 20 can be prevented.

Furthermore, the outer frame casing 14 and the outer cylinder 2 are fixed to each other by making use of the drain pipe 46, the air vent pipe 47 and the gauge attachment pipe 48 which are essentially required to install in the pump.

Figure 17:
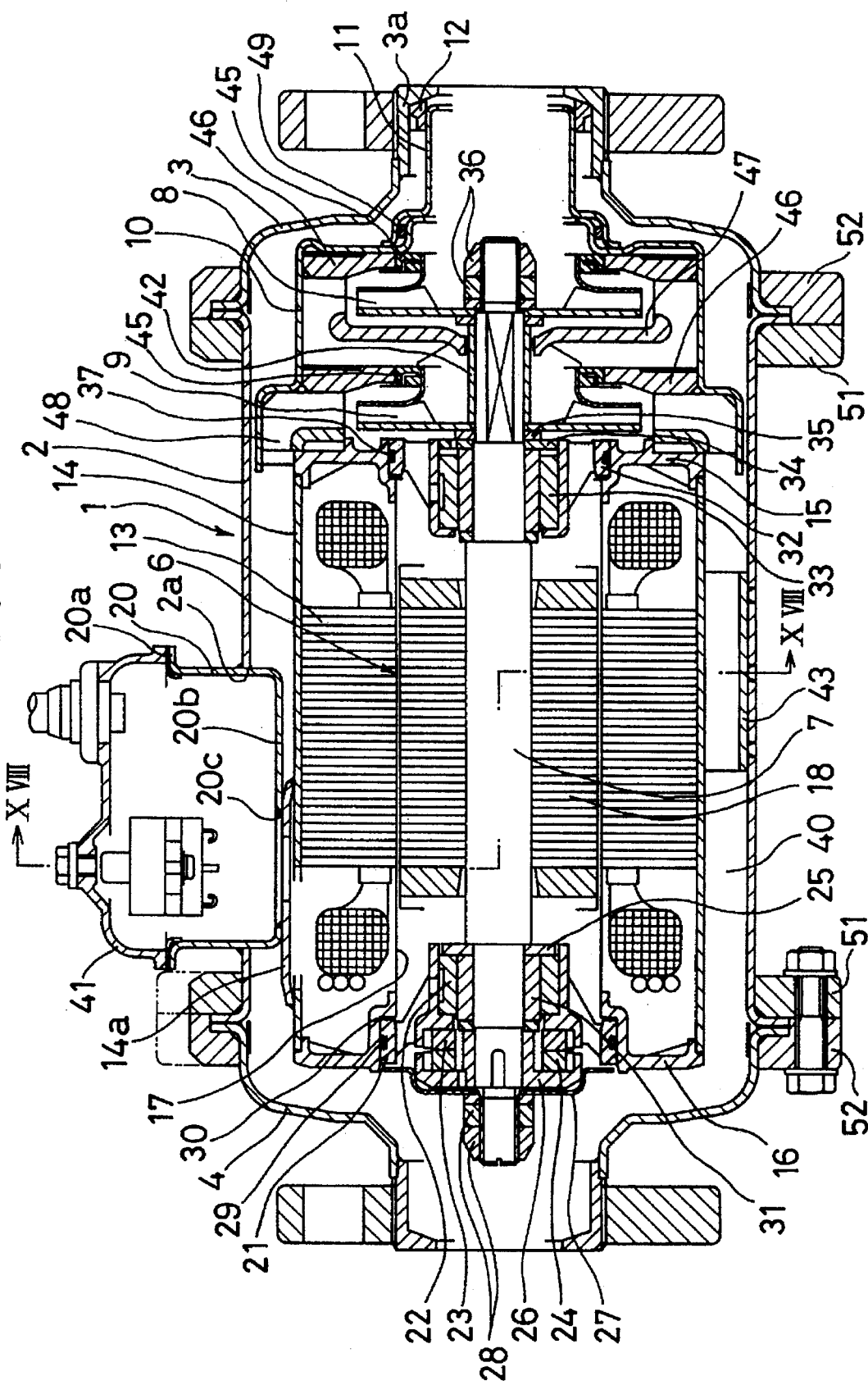
FIG. 17 is a cross-sectional view of a full-circumferential flow pump according to a seventh embodiment of the present invention.
Figure 18:
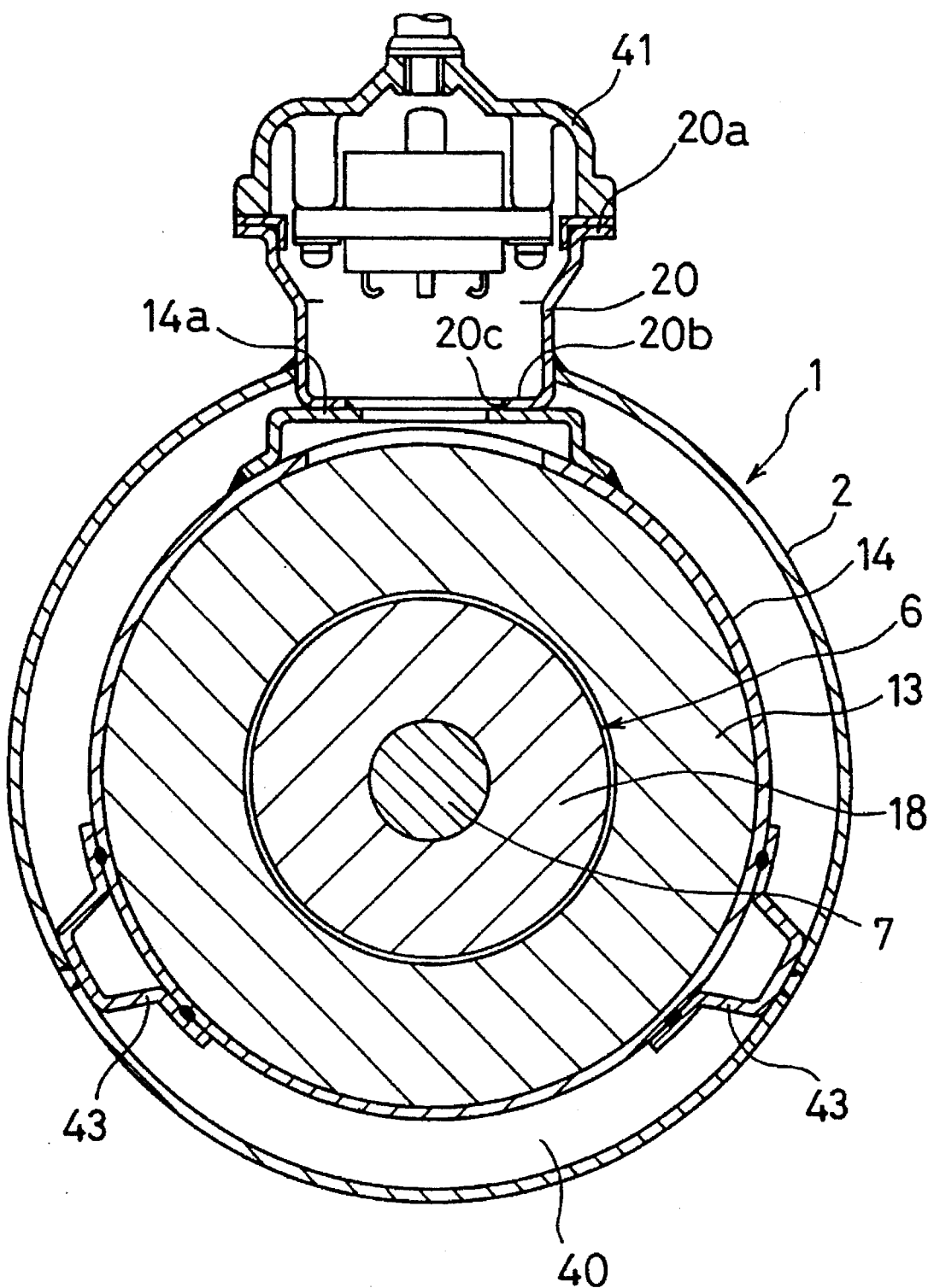
FIG. 18 is a cross-sectional view taken along line XVIII—XVIII of FIG. 17.

FIGS. 17 and 18 show an eighth embodiment of a full-circumferential flow pump using a motor stator assembly according to the present invention. The full-circumferential flow pump of this embodiment is of an in-line type.

The full-circumferential flow pump comprises a motor stator assembly 1, a rotor assembly 6 supported by the motor stator assembly 1, a pump assembly including impellers 8 and 9 fixed to a main shaft 7 of the rotor assembly 6, and pump components fixed to the both ends of the motor stator assembly 1. The motor stator assembly 1 includes a stator 13, an outer frame casing 14 fitted over the stator 13, side frame members 15, 16 welded to respective open ends of the outer frame casing 14, and a can 17 fitted in the stator 13 and welded to the side frame members 15, 16. The motor stator assembly 1 further includes an outer cylinder 2 provided around the outer frame casing 14. An annular space 40 is defined between the outer frame casing 14 and the outer cylinder 2. The pump components include a discharge-side casing 4 and a suction-side casing 3 connected to the respective ends of the outer cylinder 2 by flanges 51 and 52. The outer cylinder 2, the suction-side casing 3 and the discharge-side casing 4 are made of sheet metal such as stainless steel and jointly serve as a pump casing.

The first-stage impeller 8 and the second-stage impeller 9 are housed in a first inner casing 10. In the first inner casing 10, there are provided supporting members 46 having a liner ring 45 on the respective inner ends thereof, a return blade 47 for guiding fluid discharged from the first-stage impeller 8 towards the second-stage impeller 9 and a guide device 48 for guiding fluid discharged from the second-stage impeller 9 towards the annular passage 40. A second inner casing 11 is connected to the suction-side of the first inner casing 10 with a resilient O-ring 49 interposed therebetween. A resilient seal 12 is interposed between the second inner casing 10 and a suction nozzle 3a of the suction-side casing 3.

The rotor assembly 6 comprises a rotor 18 fitted on the main shaft 7, and thrust load side and anti-thrust load side bearing units for supporting the main shaft 7.

The outer cylinder 2 has a hole 2a in which a cable housing 20 is provided. The cable housing 20 is in the form of receptacle-like body having an open end 20a and a bottom 20b. The cable housing 20 is fixed at a hole 20c formed in the bottom 20b to the outer frame casing 14 by welding. The outer cylinder 2 and the cable housing 20 are hermetically welded together. An upper cover 41 is fixed to the cable housing 20.

In this embodiment, as shown in FIG. 18, a seat member 14a is welded to the outer frame casing 14 at a position corresponding to the cable housing 20. The seat member 14a has a flat upper surface to which the cable housing 20 is attached by welding. Incidentally, the seat member 14a may be integrally formed on the outer frame casing 14 by press forming.

Bearing units which support the rotor assembly on anti-thrust and thrust load sides are the same as the first embodiment in FIGS. 1 and 2.

Figure 19:
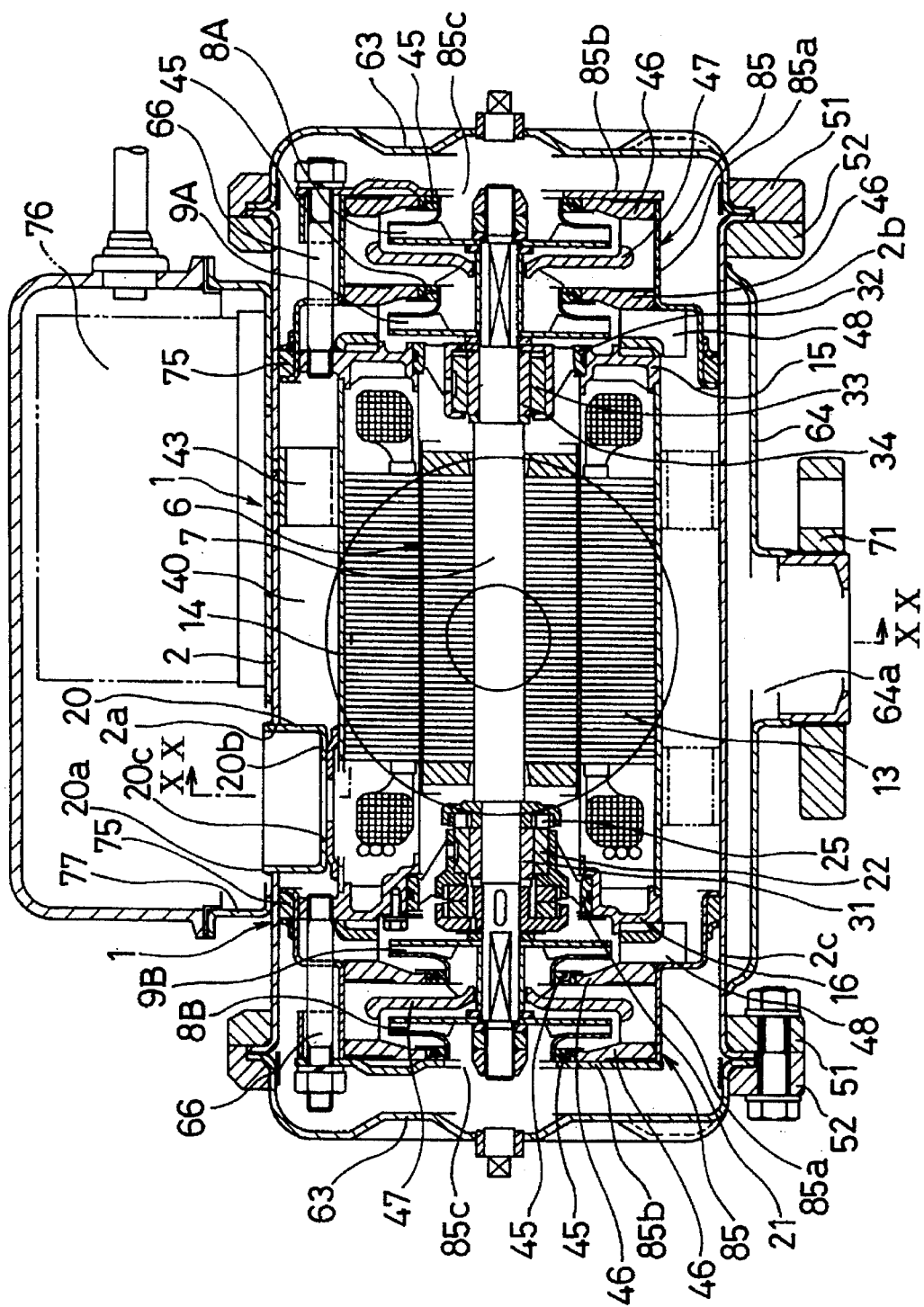
FIG. 19 is a cross-sectional view of a full-circumferential flow pump according to an eighth embodiment of the present invention.
Figure 20:
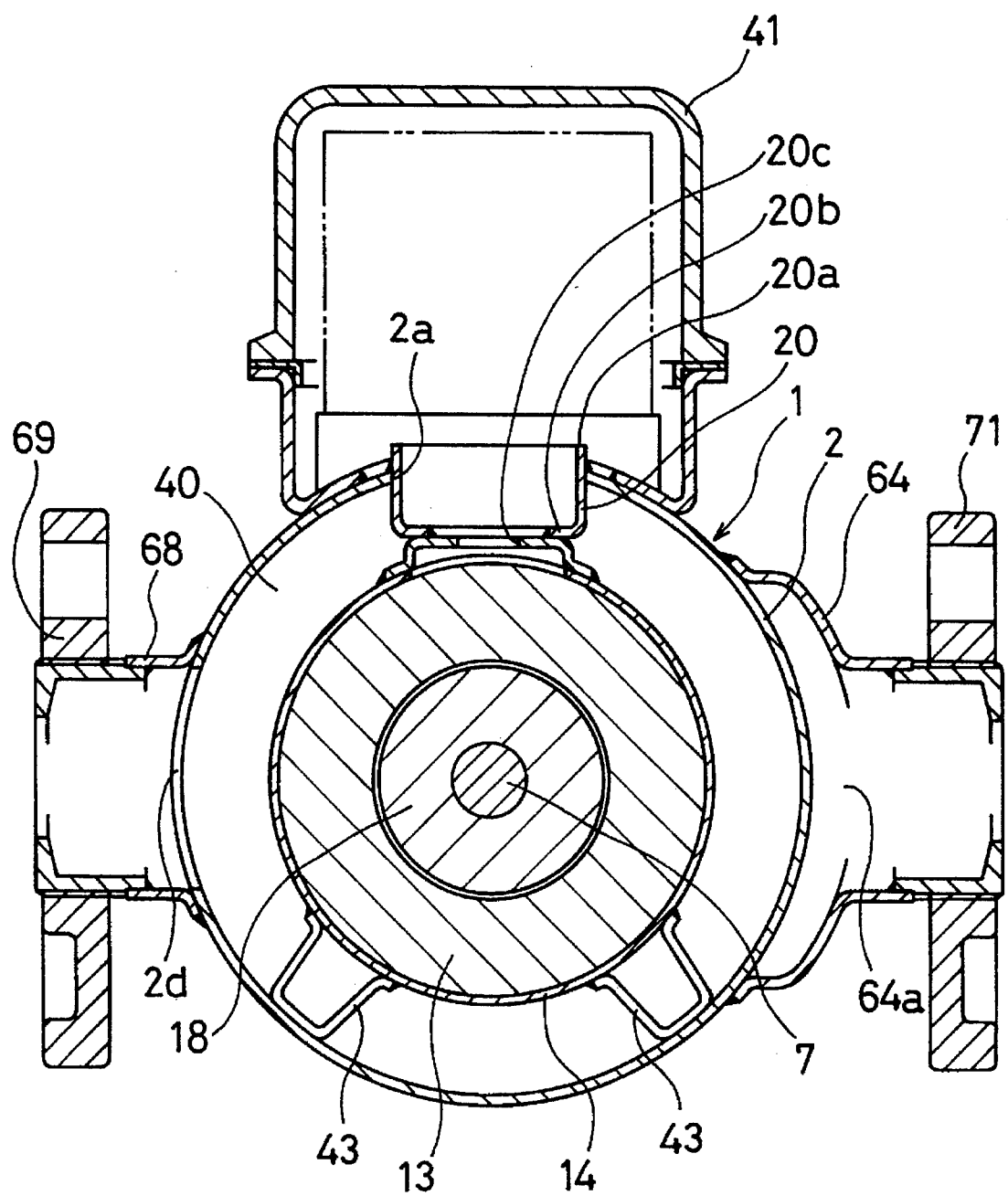
FIG. 20 is a cross-sectional view taken along line XX—XX of FIG. 19.

FIGS. 19 and 20 show a seventh embodiment of a full-circumferential flow pump using a motor stator assembly according to the present invention. The full-circumferential flow pump of this embodiment is of a double suction type.

The full-circumferential flow pump of double suction type has a motor stator assembly 1 having the same structure as that of FIG. 17. Impellers 8A and 9A and 8B and 9B each having a suction port opened axially outward are fixed to the respective ends of the main shaft 7 of a rotor assembly 6 supported by the motor stator assembly 1. A cable housing 20 is fixed to the outer frame casing 14. Covers 63 are fixed by flanges 51 and 52 to both ends of an outer cylinder 2. In the vicinity of both ends of the outer cylinder 2, there are provided suction windows 2b and 2c which are connected by a suction cover 64. The suction cover 64 is connected to the outer cylinder as shown in FIG. 20. A pump suction port 64a is formed in the central potion of the suction cover 64 and a suction flange 71 is fixed thereto.

Inner casings 85 each comprising a cylindrical member 85a and a cover 85b and having a substantially cylindrical receptacle body are fixedly provided in the outer cylinder 2. Seal members 75 are fixed to the respective flange portions of the inner casings 85. A suction opening 85c is formed in the cover 85b of each of the inner casings 85. In each of the inner casings 85, there are provided supporting members 46 having a liner ring 45 on the respective inner ends thereof, a return blade 47 for guiding fluid discharged from the first-stage impeller 8A or 8B towards the second-stage impeller 9A or 9B and a guide device 48 for guiding fluid discharged from the second-stage impeller 9A or 9B towards the annular passage 40. A discharge port 2d is formed in the central portion of the outer cylinder 2 and an discharge nozzle 68 is connected thereto as shown in FIG. 20. A discharge flange 69 is fixed to the discharge nozzle 68. The other structure is the same as that of FIG. 5.

Figure 21A:
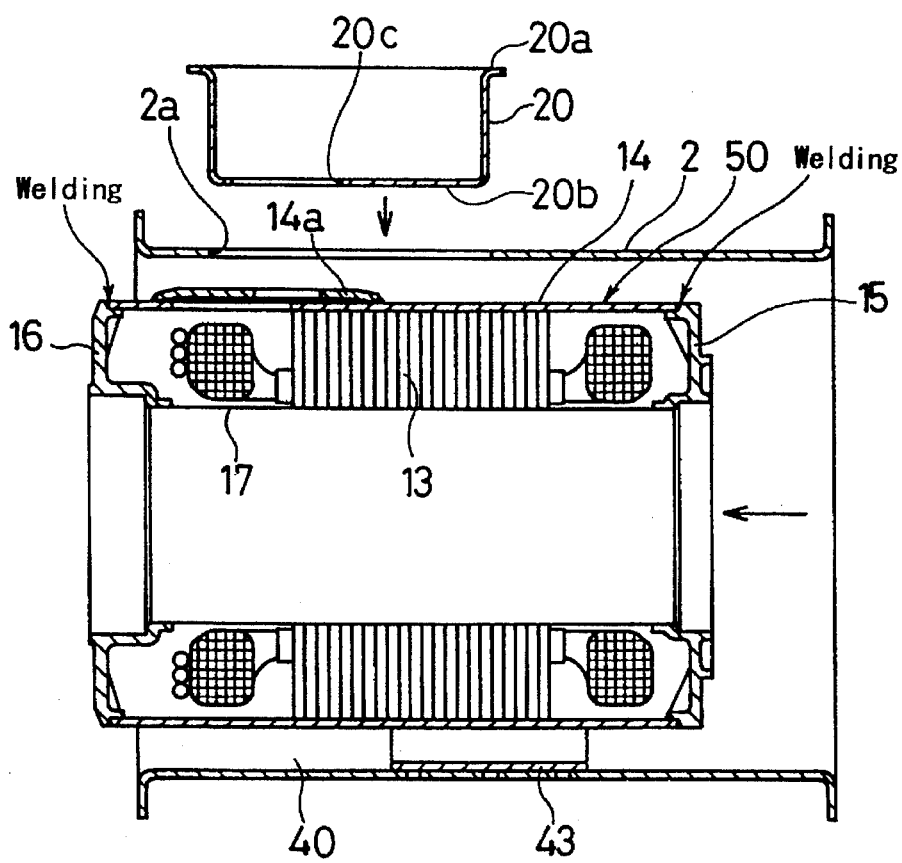
FIG. 21A is a cross-sectional view showing the manner in which the motor stator assembly is manufactured.
Figure 21B:
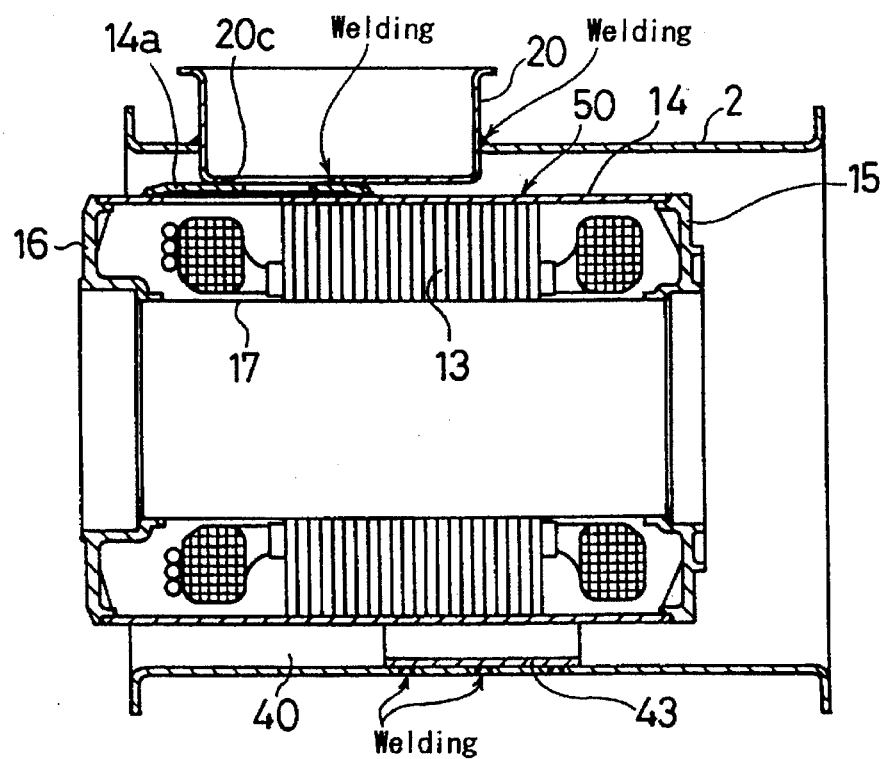
FIG. 21B is a cross-sectional view showing the manner in which the motor stator assembly is manufactured.

Next, a method of manufacturing a motor stator assembly used in a full-circumferential flow pump in FIGS. 17 through 20 will be described below with reference to FIG. 21.

First, as shown in FIG. 20A, the side frame members 15 and 16 are welded to the outer frame casing 14, the seat member 14a is welded to the outer frame casing 14, and the stays 43 are welded to the outer frame casing 14, thereby forming an assembly 50.

Next, the assembly 50 is inserted into the outer cylinder 2 having the hole 2a, and then the cable housing 20 is inserted into the hole 2a of the outer cylinder 2 from the outside of the outer cylinder 2. Thereafter, as shown in FIG. 20B, the cable housing 20 is hermetically welded to the outer frame casing 14 through the hole 20c, and the cable housing 20 is hermetically welded to the outer cylinder 2. Further, the stays 43 and the outer cylinder 2 are welded together through small holes formed in the outer cylinder 2. In this manner, the assembly 50 is fixed to the outer cylinder 2.

The full-circumferential flow pump of FIG. 17 is manufactured in the same manner as that of in FIG. 1.

According to the embodiments in FIGS. 17 through 21, the cable housing 20 is in the form of a receptacle-like body having the open end 20a and the bottom 20b, and the lead hole 20c for allowing leads to pass therethrough is formed in the bottom 20b. The cable housing 20 is inserted into the hole 2a of the outer cylinder 2 from the outside of the outer cylinder 2, and hermetically welded to the outer frame casing 14 through the hole 20c and also the outer cylinder 2. Thus, the outer cylinder 2 can be elongated axially so as to cover the end portions of the motor frame.

In a full-circumferential flow pump of an in-line type, a suction-side casing and a discharge-side casing are formed into shaped which are easy to be pressed by making their axial depths small. In a double suction type pump, suction windows 2b, 2c can be formed in the elongated outer cylinder 2.

Further, even if the cable housing projects radially, the outer cylinder 2 can be mounted on the outer frame casing 14 and a wide space for housing leads can be formed in the cable housing 20.

Furthermore, since the seat member 14a having a flat upper surface is provided on the outer frame casing 14 integrally or by a separate member, it is not necessary to form the bottom of the cable housing 20 into a curved surface. Therefore, the cable housing 20 can be easily pressed, and three-dimensional welding or curved welding is not required.

Although certain preferred embodiments of the present invention has been shown and described in detail, it should be understood that various changes and modifications may be made therein without departing from the scope of the appended claims.

What is claimed is:

1. A motor stator assembly for use in a full-circumferential flow pump comprising:

a stator;

an outer frame casing encasing said stator;

an outer cylinder made of sheet metal disposed around said outer frame casing with an annular space defined therebetween, liquid handled by said pump being introduced into said annular space; and a cable housing for housing leads of said stator, said housing being hermetically welded to said outer frame casing and said outer cylinder;

wherein said cable housing has a receptacle-like body having an open end and a bottom, said open end is welded to said outer frame casing, and said bottom has a hole for taking out leads of said stator, said cable housing having a dimension larger than that of said hole in at least one direction within said annular space.

2. The motor stator assembly according to claim 1, wherein said outer cylinder has a hole into which said cable housing which has been welded to said outer frame casing is inserted from the inside of said outer cylinder, and said cable housing and said outer cylinder are welded together at said hole of said outer cylinder.

3. The motor stator assembly of claim 1 wherein said receptacle-like body comprises a terminal box for the leads of said stator.

4. A motor stator assembly for use in a full-circumferential flow pump comprising:

a stator;

an outer frame casing encasing said stator;

an outer cylinder made of sheet metal disposed around said outer frame casing with an annular space defined therebetween, liquid handled by said pump being introduced into said annular space; and a cable housing for housing leads of said stator, said housing being hermetically welded to said outer frame casing and said outer cylinder;

wherein said cable housing has a receptacle-like body having an open end and a bottom, and said bottom has a lead hole for taking out leads of said stator and is welded to said outer frame casing through said lead hole, said cable housing having a dimension larger than that of said hole in at least one direction within said annular space.

5. The motor stator assembly according to claim 4, wherein said outer cylinder has a hole into which said cable housing is inserted from the outside of said outer cylinder.

6. The motor stator assembly according to claim 4, wherein said outer cylinder is formed by winding a flat plate and connecting a winding starting end and a winding terminating end together.

7. The motor stator assembly of claim 4 wherein said receptacle-like body comprises a terminal box for the leads of said stator.

8. The motor stator assembly according to claim 4, wherein said cable housing has an oblong cross section which is long in an axial direction of said outer frame casing and short in a circumferential direction of said outer frame casing.

9. The motor stator assembly according to claim 4, further comprising stays for connecting said outer frame casing and said outer cylinder.

10. A motor stator assembly for use in a full-circumferential flow pump comprising:

a stator;

an outer frame casing encasing said stator;

projections provided on said outer frame casing and projecting radially outwardly; and an outer cylinder made of sheet metal disposed around said outer frame casing with an annular space defined therebetween, said outer cylinder being formed by winding sheet metal so as to surround said projections, and liquid handled by said pump being introduced into said annular space, wherein one of said projections comprises a cable housing for housing leads of said stator, and wherein said cable housing has a receptacle-like body with a lead hole for taking out leads of said stator, said cable housing having a dimension larger than that of said hole in at least one direction within said annular space.

11. The motor stator assembly according to claim 10, further comprising fixing means provided on axial ends of said outer cylinder, for fixing pump components to said axial ends of said outer cylinder.

12. The motor stator assembly according to claim 10, wherein said cable housing is located between a winding starting end and a winding terminating end.

13. A motor stator assembly comprising:

a stator;

an outer frame casing encasing said stator;

projections provided on said outer frame casing and projecting radially outwardly; and an outer cylinder made of sheet metal disposed around said outer frame casing with an annular space defined therebetween, said outer cylinder being formed by two annular members each having a notch at one end thereof, said one of said projections is fitted in said notches of said annular members.

14. The motor stator assembly according to claim 13, wherein one of said projections comprises a cable housing for housing leads of said stator.

15. The motor stator assembly according to claim 13, wherein one of said projections comprises a stay which is located at a position where said two annular members are connected together.

* * * * *

UNITED STATES PATENT AND TRADEMARK OFFICE
CERTIFICATE OF CORRECTION

PATENT NO. : 5,648,694
DATED : JULY 15, 1997
INVENTOR(S) : MAKOTO KOBAYASHI ET AL

It is certified that error appears in the above-indentified patent and that said Letters Patent is hereby corrected as shown below:

Column 13, line 35, after "claim" insert --1 or--;

line 42, after "claim" insert --1 or--;

line 47, after "claim" insert --1 or--.

Signed and Sealed this

Sixth Day of January, 1998

Attest:

BRUCE LEHMAN

Attesting Officer

Commissioner of Patents and Trademarks